(12) United States Patent
Hirao et al.

(10) Patent No.: US 10,487,904 B2
(45) Date of Patent: Nov. 26, 2019

(54) CYLINDER DEVICE

(71) Applicant: HITACHI AUTOMOTIVE SYSTEMS, LTD., Ibaraki (JP)

(72) Inventors: Motohiro Hirao, Sgamihara (JP); Umi Tanabe, Kawasaki (JP); Osamu Yuno, Yokohama (JP); Shigeo Katayama, Madison County, KY (US); Tomoyuki Ri, Kawasaki (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 15/760,806

(22) PCT Filed: Sep. 14, 2016

(86) PCT No.: PCT/JP2016/077123
§ 371 (c)(1),
(2) Date: Mar. 16, 2018

(87) PCT Pub. No.: WO2017/047646
PCT Pub. Date: Mar. 23, 2017

(65) Prior Publication Data
US 2018/0252290 A1 Sep. 6, 2018

(30) Foreign Application Priority Data

Sep. 18, 2015 (JP) .................................. 2015-185780
Mar. 29, 2016 (JP) .................................. 2016-065634

(51) Int. Cl.
*F16F 9/53* (2006.01)
*F16F 9/32* (2006.01)
*F16F 9/54* (2006.01)

(52) U.S. Cl.
CPC .............. *F16F 9/53* (2013.01); *F16F 9/3235* (2013.01); *F16F 9/3271* (2013.01); *F16F 9/54* (2013.01)

(58) Field of Classification Search
CPC .... F16F 9/53; F16F 9/54; F16F 9/3207; F16F 9/3271; F16F 9/532
(Continued)

(56) References Cited

U.S. PATENT DOCUMENTS 4,819,772 A * 4/1989 Rubel ..................... F16F 9/532
188/266.8
4,838,392 A * 6/1989 Miller ................ B60G 17/0152
137/513.7
(Continued)

FOREIGN PATENT DOCUMENTS

DE    10 2013 013 488    2/2015
JP         4-266636        9/1992
(Continued)

OTHER PUBLICATIONS

International Search Report dated Oct. 11, 2016 in International (PCT) Application No. PCT/JP2016/077123.

*Primary Examiner* — Christopher P Schwartz
(74) *Attorney, Agent, or Firm* — Wenderoth, Lind & Ponack, L.L.P.

(57) ABSTRACT

An intermediate cylinder is disposed between an outer cylinder and an inner cylinder. The intermediate cylinder forms a passage between the inner cylinder and itself, through which a hydraulic fluid as an electrorheological fluid flows. The intermediate cylinder is supplied (applied) with a voltage through an electrode connector. The intermediate cylinder includes a ring member. The ring member is provided with an extending portion which extends toward the outer cylinder. The extending portion of the ring member
(Continued)

is inserted with an electrode pin as an imparting unit for imparting a voltage to the intermediate cylinder.

13 Claims, 12 Drawing Sheets

(58) Field of Classification Search
USPC .................................. 188/267, 267.1, 267.2
See application file for complete search history.

(56) References Cited

U.S. PATENT DOCUMENTS

| | | | | |
|---|---|---|---|---|
| 5,259,487 A | * | 11/1993 | Petek | F16F 9/532 |
| | | | | 188/267.1 |
| 5,353,897 A | * | 10/1994 | Woessner | F16F 9/512 |
| | | | | 188/267 |
| 5,588,509 A | * | 12/1996 | Weitzenhof | F16F 9/532 |
| | | | | 188/267.1 |
| 5,590,745 A | * | 1/1997 | Rensel | F16F 9/532 |
| | | | | 188/267.1 |
| 7,997,392 B2 | * | 8/2011 | Stork | F16F 9/532 |
| | | | | 188/267.1 |
| 9,662,952 B2 | * | 5/2017 | Funke | F16F 9/346 |

FOREIGN PATENT DOCUMENTS

| | | |
|---|---|---|
| JP | 5-99260 | 4/1993 |
| JP | 8-200430 | 8/1996 |
| JP | 9-4669 | 1/1997 |

\* cited by examiner

CYLINDER DEVICE

TECHNICAL FIELD

The invention relates to cylinder devices suitably used to absorb the vibration which occurs in vehicles, such as automobiles and railway vehicles.

BACKGROUND ART

Vehicles, such as automobiles, are in general equipped with cylinder devices, typified by hydraulic shock absorbers, between the vehicle-body (sprung) side and the wheel (unsprung) side. The Patent Literature 1 discloses a damper (shock absorber) using an electrorheological fluid, in which a voltage is imparted to an electrode (electrode) through a compression spring.

CITATION LIST

Patent Literature

PTL 1: German Patent Application Publication No. 102013013488 A1

SUMMARY OF INVENTION

The Patent Literature 1 discloses a configuration in which only the compression spring, serving as a voltage imparting unit, is disposed in a manner protruding toward the electrode (electrode) which is an intermediate cylinder within the reservoir chamber of the shock absorber. The fluid force of the fluid flowing through the reservoir chamber is therefore directly applied only to the compression spring. Not only because of this factor, but also because of the vibration produced during vehicle running, it is considered difficult to successfully transmit a voltage to the electrode (electrode) through the compression spring.

It is an object of the invention to provide a cylinder device which makes it possible to improve stability in imparting a voltage (electric field) or a magnetic field from an imparting unit to an intermediate cylinder.

To solve the problem, the cylinder device according to the invention comprises an inner cylinder containing a functional fluid which changes in fluid condition under the presence of an electric field or a magnetic field, the inner cylinder being inserted with a rod; an outer cylinder disposed on the outside of the inner cylinder; an intermediate cylinder disposed between the inner cylinder and the outer cylinder to create a passage between the inner cylinder and the intermediate cylinder, through which the functional fluid flows from one end side to the other end side in an axial direction in response to an advancing/returning movement of the rod, the intermediate cylinder serving as an electrode or a magnetic pole; a reservoir chamber formed between the intermediate cylinder and the outer cylinder and containing the functional fluid and a working gas; a rod guide disposed so as to close one end of the inner cylinder and one end of the outer cylinder and supporting the rod; and an imparting unit configured to impart an electric field or a magnetic field from an electric field supply unit or a magnetic field supply unit to the intermediate cylinder. The intermediate cylinder is provided in an outer peripheral side with an extending portion which extends toward the outer cylinder. The imparting unit is inserted in the extending portion in an electrically contacted manner.

The cylinder device of the invention makes it possible to improve stability in imparting the voltage (electric field) or the magnetic field from the imparting unit to the intermediate cylinder.

DESCRIPTION OF EMBODIMENTS

Cylinder devices according to embodiments will be described below with reference to the attached drawings on the premise, as an example, that the cylinder devices are applied to shock absorbers installed in vehicles, such as four-wheel automobiles.

Figure 1:
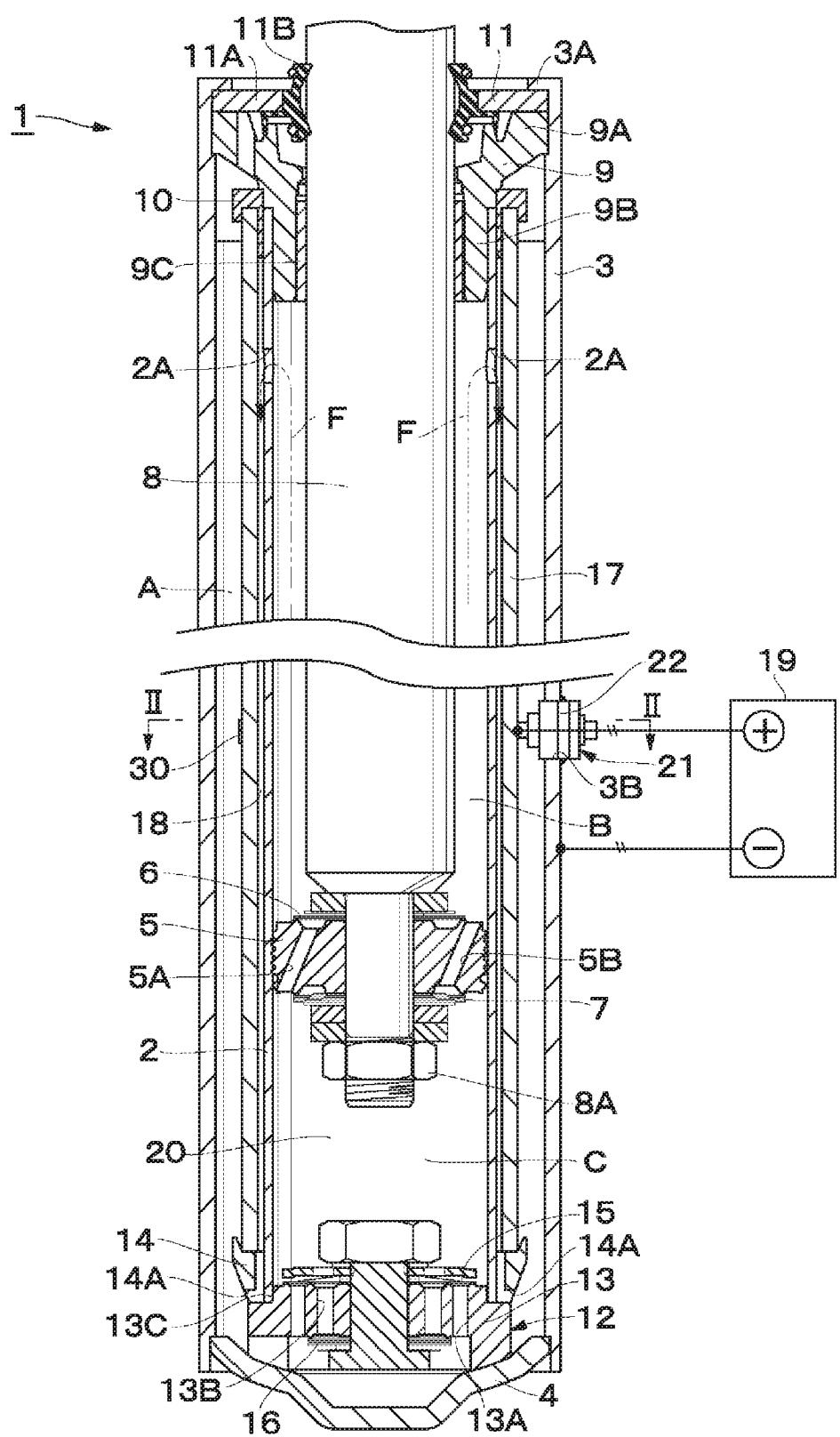
FIG. 1 is a longitudinal sectional view of a shock absorber as a cylinder device according to a first embodiment.
Figure 2:
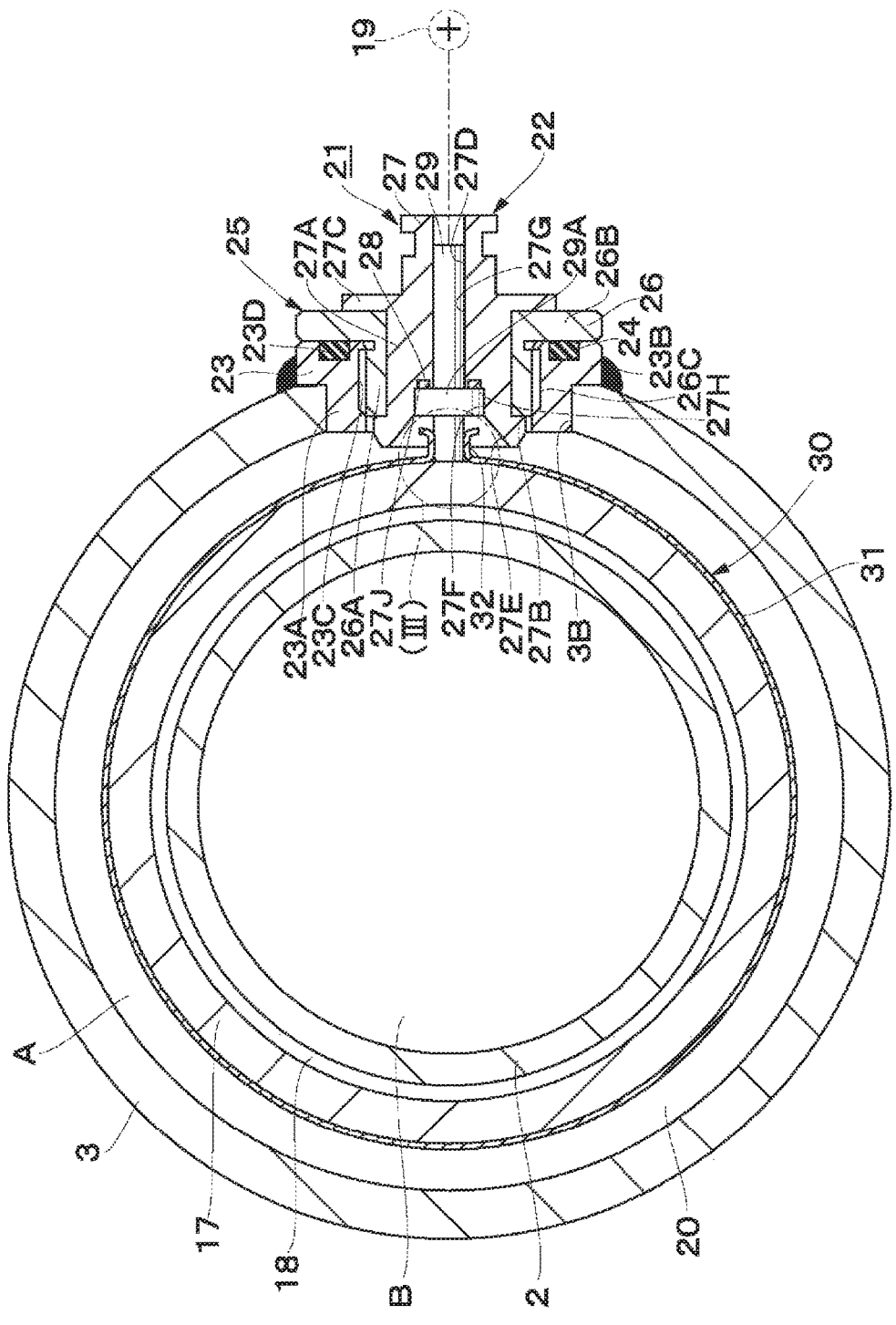
FIG. 2 is a cross-sectional view of an outer cylinder, an intermediate cylinder, an electrode connector, and other components, as viewed from a II-II direction in FIG. 1.
Figure 3:
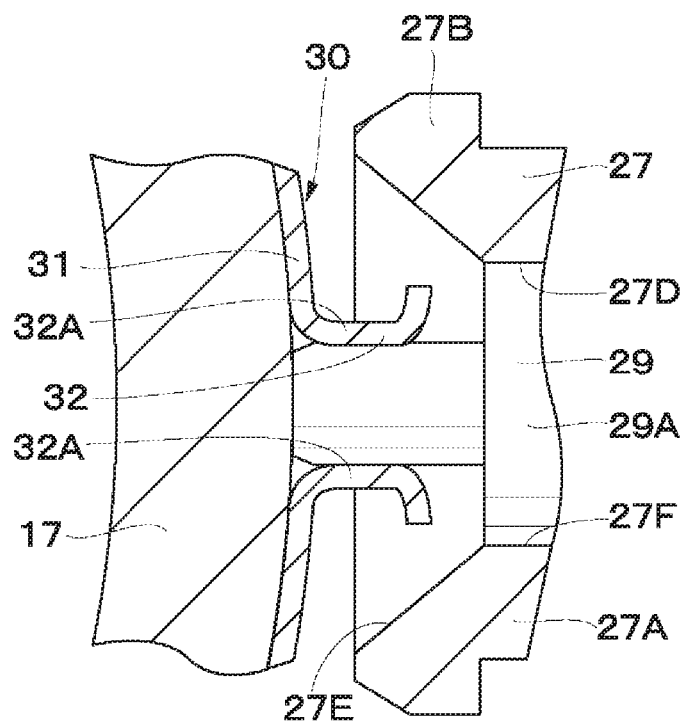
FIG. 3 is an enlarged sectional view of an area represented by (III) in FIG. 2, which includes an electrode pin, an extending portion of a ring member, and other components of the electrode connector.

FIGS. 1 to 3 show a first embodiment. FIG. 1 shows a shock absorber 1 as a cylinder device. The shock absorber 1 is configured as a hydraulic shock absorber (semi-active damper) of a damping force adjustment type, which uses a functional fluid (namely, electrorheological fluid) as a hydraulic fluid 20, such as hydraulic oil, to be sealed inside the shock absorber 1. The shock absorber 1 forms a suspension device for a vehicle in consort with a suspension spring, not shown, comprising a coil spring, for example. In the following description, one axial end side of the shock absorber 1 will be referred to as an "upper end" side, and the other axial end side as a "lower end" side.

The shock absorber 1 includes an inner cylinder 2, an outer cylinder 3, a piston 5, a piston rod 8, an intermediate cylinder 17, and other components. The inner cylinder 2 is formed as a circular cylinder-shaped cylindrical body extending in an axial direction. The hydraulic fluid 20 (functional fluid) discussed later is sealed in the inner cylinder 2. The piston rod 8 discussed later is inserted in the inner cylinder 2, and the outer cylinder 3 is disposed on the outside of the inner cylinder 2 in a manner coaxial with the inner cylinder 2.

The outer cylinder 3 is an outer shell of the shock absorber 1 and formed into a circular cylindrical body. The outer cylinder 3 has a lower end side which is a closed end. The closed end is closed with a bottom cap 4 by means of a welding device or the like. The bottom cap 4 forms a base member in consort with a valve body 13 of a bottom valve 12 discussed later. The outer cylinder 3 has an upper end side which is an open end. Formed in the open end side of the outer cylinder 3 is a caulking portion 3A which is bent in a radially inward direction. The caulking portion 3A holds an outer periphery of an annular plate 11A of a sealing member 11 so as to prevent the annular plate 11A from coming off. The outer cylinder 3 is further provided with an attachment hole 3B into which an intermediate electrode member 22 of an electrode connector 21 discussed later is attached. The attachment hole 3B is formed into a radial transverse hole (through-hole).

The inner cylinder 2 is disposed inside the outer cylinder 3 in a manner coaxial with the outer cylinder 3. The inner cylinder 2 has a lower end side fitted onto the valve body 13 of the bottom valve 12, and an upper end side fitted onto a rod guide 9. The inner cylinder 2 is provided with a plurality of (four, for example) oil holes 2A spaced at intervals in a circumferential direction in the form of radial transverse holes. The oil holes 2A are normally in communication with a passage 18 discussed later. The cylinder 2 includes a rod-side oil chamber B in communication with the passage 18 through the oil holes 2A.

The inner cylinder 2 forms a cylinder in consort with the outer cylinder 3. The cylinder contains the hydraulic fluid 20. The embodiments use an electrorheological fluid (ERF, namely, Electro Rheological Fluid) as a fluid to be filled (sealed) in the cylinder, or the hydraulic fluid 20, which serves as hydraulic oil. The drawings show the hydraulic fluid 20 sealed in the cylinder as being colorless and transparent.

The electrorheological fluid is a kind of functional fluids which change in fluid condition in response to external stimuli. The electrorheological fluid is a fluid which changes in condition under the presence of an electric field (voltage). More specifically, the electrorheological fluid changes in flow resistance (damping force) according to an applied voltage. The electrorheological fluid includes, for example, base oil (base oil) comprising a silicone oil or the like, and particles (fine particles) mixed into (dispersed in) the base oil to make viscosity variable depending on changes of the electric field. The shock absorber 1 is configured to generate a potential difference within the passage 18 discussed later and thus control the viscosity of the electrorheological fluid passing through the passage 18 to control (adjust) a generated damping force. The embodiments are explained with the electrorheological fluid (ER fluid) given as an example of the functional fluid. However, the functional fluid may be, for example, a magnetic fluid (MR fluid).

An annular reservoir chamber A is formed between the inner cylinder 2 and the outer cylinder 3. A gas serving as a working gas is sealed in the reservoir chamber A together with the hydraulic fluid 20. The gas may be an air under atmospheric pressure. It is also possible to use a compressed nitrogen gas or another gas. During the recession (contraction stroke) of the piston rod 8, the gas contained in the reservoir chamber A is compressed in order to compensate for a volume by which the piston rod 8 advances.

The piston 5 is slidably fitted (inserted) in the inner cylinder 2. The piston 5 defines a rod-side oil chamber B and a bottom-side oil chamber C from each other within the inner cylinder 2. The piston 5 is provided with a plurality of oil passages 5A and a plurality of oil passages 5B, which are spaced at intervals in the circumferential direction. The oil passages 5A and 5B permit communication between the rod-side oil chamber B and the bottom-side oil chamber C. Shock absorbers 1 of the embodiments have a uniflow structure. The hydraulic fluid 20 contained in the inner cylinder 2 therefore flows normally in one direction (the direction of an arrow F shown by a chain double-dashed line in FIG. 1) from the rod-side oil chamber B (oil holes 2A of the inner cylinder 2) toward the passage 18 during both the contraction and expansion strokes of the piston rod 8.

To materialize such a uniflow structure, the piston 5 is provided in an upper end surface, for example, with a contraction-side check valve 6. The contraction-side check valve 6 is opened when the piston 5 is downwardly displaced in a sliding manner within the inner cylinder 2 during the receding stroke (contraction stroke) of the piston rod 8. The contraction-side check valve 6 is closed otherwise. The contraction-side check valve 6 allows oil (hydraulic fluid 20) contained in the bottom-side oil chamber C to flow through the oil passages 5A toward the rod-side oil chamber B, and blocks the oil from flowing in the other direction.

Disposed in a lower end surface of the piston 5 is, for example, an extension-side disc valve 7. The extension-side disc valve 7 is opened if pressure within the rod-side oil chamber B exceeds a relief set pressure when the piston 5 is upwardly displaced in the sliding manner within the inner cylinder 2 during the extension stroke (expansion stroke) of the piston rod 8. The extension-side disc valve 7 relieves the pressure which has exceeded the relief set pressure to the bottom-side oil chamber C side through the oil passages 5B.

The piston rod 8, which serves as a rod, extends within the inner cylinder 2 in the axial direction (the same direction as a central axis direction of the inner cylinder 2 and that of the outer cylinder 3, and therefore a central axis direction of the shock absorber 1, or a vertical direction in FIG. 1). To be more specific, the piston rod 8 has a lower end side coupled (fixed) to the piston 5 within the inner cylinder 2, and an upper end side extending outside of the inner cylinder 2 and the outer cylinder 3, which form the cylinder. The piston 5 is fixed (secured) to the lower end side of the piston rod 8 by means of a nut 8A or the like. The upper end side of the piston rod 8 extends outside through the rod guide 9. The piston rod 8 may be formed into a so-called double rod by further elongating the lower end of the piston rod 8 so that the lower end outwardly protrudes from a bottom portion (for example, the bottom cap 4) side.

The rod guide 9 having a stepped circular cylinder-like shape is fitted onto the upper end side (one end side) of the inner cylinder 2 and that of the outer cylinder 3 so as to close the upper end side of the inner cylinder 2 and that of the outer cylinder 3. The rod guide 9 supports the piston rod 8. The rod guide 9 is formed into a cylindrical body having a predetermined shape, for example, by applying molding, cutting or the like to metal material, hard resin material or another material. The rod guide 9 positions an upper part of the cylinder 2 and an upper part of the intermediate cylinder 17 discussed later at the center of the outer cylinder 3. The rod guide 9 further directs (guides) the piston rod 8 along an inner periphery of the rod guide 9 so that the piston rod 8 may slide in the axial direction.

The rod guide 9 is formed in the shape like a stepped circular cylinder including an annular large diameter portion 9A located on the upper side and inserted in an inner peripheral side of the outer cylinder 3, and a short cylinder-shaped small diameter portion 9B located under the large diameter portion 9A and inserted in an inner peripheral side of the inner cylinder 2. A guide portion 9C is disposed in an inner peripheral side of the small diameter portion 9B of the rod guide 9. The guide portion 9C guides the piston rod 8 so that the piston rod 8 may slide in the axial direction. The guide portion 9C is formed, for example, by coating an inner peripheral surface of a metal cylinder with polytetrafluoroethylene.

An annular holding member 10 is fitted to an outer peripheral side of the rod guide 9 to be located between the large diameter portion 9A and the small diameter portion 9B. The holding member 10 holds an upper end side of the intermediate cylinder 17 discussed later with the upper end side axially positioned. The holding member 10 is made, for example, of electrical insulation material (isolator). The holding member 10 keeps the inner cylinder 2 and the rod guide 9 electrically insulated from the intermediate cylinder 17.

An annular seal member 11 is disposed between the large diameter portion 9A of the rod guide 9 and the caulking portion 3A of the outer cylinder 3. The seal member 11 includes the metallic, annular plate 11A provided in the center with a hole, through which the piston rod 8 is inserted. The seal member 11 further includes an elastic body 11B made of elastic material. The elastic body 11B is fixed to the annular plate 11A by baking or another method. The elastic body 11B of the seal member 11 has an inner periphery which comes into a sliding contact with the outer periphery of the piston rod 8 to enclose (seal) a gap between the piston rod 8 and the seal member 11 in a liquid- and gas-tight manner.

The bottom valve 12 is disposed in the lower end side (the other end side) of the inner cylinder 2 to be located between the inner cylinder 2 and the bottom cap 4. The bottom valve 12 includes the valve body 13, an expansion-side check valve 15, and a disc valve 16. The valve body 13 is located between the bottom cap 4 and the inner cylinder 2 to define the reservoir chamber A and the bottom-side oil chamber C from each other. The valve body 13 is provided with oil passages 13A and 13B spaced from each other in the circumferential direction. The oil passages 13A and 13B permit communication between the reservoir chamber A and the bottom-side oil chamber C.

An outer peripheral side of the valve body 13 is provided with a stepped portion 13C. The inner peripheral side of the lower end of the inner cylinder 2 is fitted to the stepped portion 13C. An annular holding member 14 is attached to the stepped portion 13C while being fitted onto the outer peripheral side of the inner cylinder 2. The holding member 14 holds a lower end side of the intermediate cylinder 17 discussed later with the lower end side axially positioned. The holding member 14 is made, for example, of electrical insulation material (isolator). The holding member 14 keeps the inner cylinder 2 and the valve body 13 electrically insulated from the intermediate cylinder 17. The holding member 14 is provided with a plurality of oil passages 14A which bring the passage 18 discussed later into communication with the reservoir chamber A.

The expansion-side check valve 15 is placed, for example, on an upper surface side of the valve body 13. The expansion-side check valve 15 is opened when the piston 5 is upwardly displaced in the sliding manner during the extension stroke of the piston rod 8. The expansion-side check valve 15 is closed otherwise. The expansion-side check valve 15 allows oil (hydraulic fluid 20) contained in the reservoir chamber A to flow through the oil passages 13A toward the bottom-side oil chamber C. The expansion-side check valve 15 blocks the oil from flowing in the other direction.

The disc valve 16 on the receding side is disposed, for example, on a lower surface side of the valve body 13. The receding-side disc valve 16 is opened if pressure within the bottom-side oil chamber C exceeds a relief set pressure when the piston 5 is downwardly displaced in the sliding manner during the receding stroke of the piston rod 8. The disc valve 16 relieves the pressure which has exceeded the relief set pressure to the reservoir chamber A side through the oil passages 13B.

The intermediate cylinder 17 is disposed between the outer cylinder 3 and the inner cylinder 2. The intermediate cylinder 17 comprises a pressure tube extending in the axial direction. The intermediate cylinder 17 is made of electrically conductive material and forms a cylindrical electrode. The intermediate cylinder 17 forms the passage (channel, oil passage) 18 between the inner cylinder 2 and the intermediate cylinder 17. The hydraulic fluid 20 flows through the passage 18 from the upper end side toward the lower end side in the axial direction in response to the advancing/returning movement of the piston rod 8.

The intermediate cylinder 17 is more specifically mounted on the outer peripheral side of the inner cylinder 2 through the holding members 10 and 14 arranged apart from each other in the axial (vertical) direction. The upper end side of the intermediate cylinder 17 is prevented by the holding member 10 and the rod guide 9 from rotating relative to the outer cylinder 3. The lower end side of the intermediate cylinder 17 is prevented by the holding member 14, the valve body 13, and the bottom cap 4 from rotating relative to the outer cylinder 3. The intermediate cylinder 17 encloses the entire outer peripheral side of the inner cylinder 2 to form the annular passage (channel), namely, the passage 18 through which the hydraulic fluid 20 flows, in the interior of the intermediate cylinder 17, or more specifically, between the inner peripheral side of the intermediate cylinder 17 and the outer peripheral side of the inner cylinder 2. In an outer diameter side of the intermediate cylinder 17, there is disposed a ring member 30 of the electrode connector 21 discussed later in such a position as to face the attachment hole 3B of the outer cylinder 3.

The passage 18 is normally in communication with the rod-side oil chamber B through the oil holes 2A which are formed in the inner cylinder 2 in the form of the radial transverse holes. To be more specific, as illustrated in FIG. 1 where the flowing direction of the hydraulic fluid 20 is shown by the arrow F, the shock absorber 1 is so configured that the hydraulic fluid 20 flows from the rod-side oil chamber B through the oil holes 2A into the passage 18 during both the compression and expansion strokes of the piston 5. When the piston rod 8 advances/returns (when the piston rod 8 repeats the contraction and expansion strokes) within the inner cylinder 2, the hydraulic fluid 20 which has entered the passage 18 flows from the upper end side toward the lower end side of the passage 18 in the axial direction in response to the advancing/returning movement of the piston rod 8.

The hydraulic fluid 20 which has entered the passage 18 flows from the lower end side of the intermediate cylinder 17 into the reservoir chamber A through the oil passages 14A of the holding member 14. At this time, the pressure of the hydraulic fluid 20 is highest in an upstream side of the passage 18 (on the side where the oil holes 2A are located). The pressure of the hydraulic fluid 20 then decreases by degrees as the hydraulic fluid 20 is subjected to channel (passage) resistance while flowing through the passage 18. Within the passage 18, therefore, the pressure of the hydraulic fluid 20 becomes lowest when the hydraulic fluid 20 flows in a downstream side of the passage 18 (that is, the oil passages 14A of the holding member 14).

Although not shown, a partition wall member for dividing the passage 18 through which the hydraulic fluid 20 flows (for guiding the flow of the hydraulic fluid 20) may be placed between the inner peripheral side of the intermediate cylinder 17 and the outer peripheral side of the inner cylinder 2. In other words, the partition wall member may be placed in the inner peripheral surface of the intermediate cylinder 17 or the outer peripheral surface of the inner cylinder 2 so as to be incapable of rotating relative to the intermediate cylinder 17 or the inner cylinder 2, so that the partition wall member may be used to guide the hydraulic fluid 20 not only in the axial but also circumferential direction. This enables the passage through which the hydraulic fluid 20 flows to comprise one or more spiral or winding passages (channels) including circumferentially-extending portions. The passage therefore can be made longer in its entire length (distance between the oil holes 2A and the oil passages 14A) as compared to the case where the passage extends straight in the axial direction.

The passage 18 imparts resistance to the fluid, or the electrorheological fluid serving as the hydraulic fluid 20, which flows through the outer cylinder 3 and the inner cylinder 2 along with the sliding movement of the piston 5. The intermediate cylinder 17 is therefore connected to a positive electrode of a battery 19 that is a power source, for example, through a high-voltage driver, not shown, for generating a high voltage, and also through the electrode connector 21 discussed later. The battery 19 forms a voltage supply unit (electric field supply unit) in consort with the high-voltage driver. The intermediate cylinder 17 is an electrode (electrode) which applies an electric field (voltage) to the hydraulic fluid 20 that is the fluid within the passage 18, that is, the electrorheological fluid serving as the functional fluid. Both the ends of the intermediate cylinder 17 are electrically insulated by the holding members 10 and 14 having electrical insulation properties. The inner cylinder 2 is connected to a negative pole (ground) through the rod guide 9, the bottom valve 12, the bottom cap 4, the outer cylinder 3, the high-voltage driver, etc.

The high-voltage driver increases a DC voltage which is outputted from the battery 19 and supplies (outputs) the DC voltage to the intermediate cylinder 17 in accordance with a command (high voltage command) which is outputted from a controller, not shown, for variably adjusting a damping force of the shock absorber 1. Consequently, a potential difference according to the voltage applied to the intermediate cylinder 17 is generated between the intermediate cylinder 17 and the inner cylinder 2, or within the passage 18, changing the viscosity of the hydraulic fluid 20, which serves as the electrorheological fluid. The shock absorber 1 is capable of seamless adjustment of characteristics of the generated damping force (damping force characteristics) from hard characteristics (hard mode) to soft characteristics (soft mode) according to the voltage applied to the intermediate cylinder 17. Instead of seamlessly adjusting the damping force characteristics, the shock absorber 1 may be capable of adjusting the damping force characteristics in two or more steps. According to the present embodiment, the voltage increased by the high-voltage driver is a DC voltage, but may also be an AC voltage.

The Patent Literature 1 discloses the damper (shock absorber) using an electrorheological fluid. The damper is configured so that only the compression spring serving as a voltage imparting unit protrudes toward the electrode (electrode) which is an intermediate cylinder within the reservoir chamber of the shock absorber. With this configuration, the fluid force of the fluid flowing through the reservoir chamber is directly applied only to the compression spring. Not only because of such a factor, but also because of the vibrations transmitted from a road surface and the vehicle body during vehicle running, it is considered difficult to successfully transmit a voltage to the electrode (electrode) through the compression spring.

In contrast to the Patent Literature 1, the first embodiment has the configuration in which a voltage is supplied (applied) from the outside of the shock absorber 1 to the intermediate cylinder 17 through the electrode connector 21. The following description explains the electrode connector 21 of the first embodiment with reference to FIGS. 2 and 3 as well as FIG. 1. FIG. 2 omits the members (piston rod 8 and the other members) disposed within the inner cylinder 2.

The electrode connector 21 includes the intermediate electrode member 22 attached to the outer cylinder 3 and the ring member 30 attached to the intermediate cylinder 17. The intermediate electrode member 22 includes an attachment cylinder 23, a cover member 25, and an electrode pin 29.

The attachment cylinder 23 is fixed to the attachment hole 3B of the outer cylinder 3. The attachment cylinder 23 includes a cylinder portion 23A inserted in the attachment hole 3B, and a flange portion 23B disposed in a proximal end side (opposite side to a distal end side located on the intermediate cylinder 17 side) of the cylinder portion 23A and protruding from the cylinder portion 23A in a radially outward direction over the entire periphery of the cylinder portion 23A. An inner peripheral side of the cylinder portion 23A is an internal thread portion 23C screwed onto an external thread portion 26C of the cover member 25. The outer peripheral surface of the outer cylinder 3 and an outer peripheral surface of the flange portion 23B are welded together (over the entire periphery) with the cylinder portion 23A inserted in the attachment hole 3B, and with one lateral surface (inner surface, or a lateral surface on the intermediate cylinder 17 side) of the flange portion 23B in abutting contact with a region around the attachment hole 3B of the outer cylinder 3. In this way, the attachment cylinder 23 is attached to the outer cylinder 3 in the liquid- and gas-tight manner.

The other lateral surface (outer lateral surface, or a lateral surface on the opposite side to the intermediate cylinder 17 side) of the flange portion 23B is provided with a ring-shaped seal groove 23D. Attached to the seal groove 23D is a seal ring (O-ring) 24 made of high-polymer material (rubber material including synthetic rubbers, resin material including synthetic resins). The seal ring 24 is held (or more specifically, squeezed) between the flange portion 23B of the attachment cylinder 23 and a flange portion 26B of the cover member 25 by the threaded engagement between the internal thread portion 23C of the attachment cylinder 23 and the external thread portion 26C of the cover member 25. A gap between an inner diameter side of the attachment cylinder 23 and an outer diameter side of the cover member 25 is sealed in the liquid- and gas-tight manner.

The cover member 25 is a member which covers the electrode pin 29. The cover member 25 is attached to the attachment cylinder 23 by threaded engagement (secured to the attachment cylinder 23 by thread fastening). The cover member 25 includes a flanged cylinder-like metal cover 26, which serves as, a first cover, and a flanged cylinder-like resin cover 27, which serves as a second cover molded on an inner side of the metal cover 26.

The metal cover 26 is made of metal material and formed, for example, as a reinforcing member (frame member) for securing the strength of the cover member 25. The metal cover 26 includes a cylinder portion 26A inserted in the attachment cylinder 23, and the flange portion 26B disposed in a proximal end side (opposite side to a distal end which is the intermediate cylinder 17 side) of the cylinder portion 26A and protruding from the cylinder portion 26A in the radially outward direction over the entire periphery of the cylinder portion 26A. An outer peripheral side of the cylinder portion 26A is the external thread portion 26C screwed into the internal thread portion 23C of the attachment cylinder 23. The cover member 25 is applied with an axial force, or a force acting to press the cover member 25 (and the electrode pin 29) toward the intermediate cylinder 17 along with the threaded engagement between the internal thread portion 23C of the attachment cylinder 23 and the external threaded portion 26C of the cover member 25.

The resin cover 27 is made of electrically non-conductive resin material (including synthetic resins), and inserted with the electrode pin 29. The resin cover 27 is an insulating member which electrically insulates the electrode pin 29 from the metal cover 26 (and the attachment cylinder 23). The resin cover 27 includes an intermediate cylinder portion 27A inserted in an inner side of the cylinder portion 26A of the metal cover 26. The resin cover 27 further includes a distal end-side flange portion 27B and a proximal end-side cylinder portion 27C disposed in both axial ends of the intermediate cylinder portion A to hold the metal cover 26 in the axial direction.

The resin cover 27 is further provided with a through-bore 27D extending through the resin cover 27 in the axial direction. The electrode pin 29 is inserted into the through-bore 27D. The through-bore 27D is provided in the distal end side (intermediate cylinder 17 side) with a conical hollow portion 27E, an inner diameter of which decreases toward the proximal end side (opposite side to the intermediate cylinder 17 side); a large diameter portion 27F fitted with a large diameter portion 29A of the electrode pin 29; and a small diameter portion 27G fitted with a portion of the electrode pin 29, which is located closer to the proximal end than the large diameter portion 27A.

The through-bore 27D includes a stepped portion 27H connecting the large diameter portion 27F and the small diameter portion 27G to each other. The stepped portion 27H is provided with an annular seal groove 27J. Placed in the seal groove 27J is a seal ring (O-ring) 28 made of high-polymer material (rubber material including synthetic rubbers, resin material including synthetic resins). The seal ring 28 is held (or more specifically, squeezed) between the stepped portion 27H of the through-bore 27D and the large diameter portion 29A of the electrode pin 29 by the threaded engagement between the internal thread portion 23C of the attachment cylinder 23 and the external thread portion 26C of the cover member 25. A gap between an inner diameter side of the resin cover 27 and an outer diameter side of the electrode pin 29 is thus sealed in the liquid- and gas-tight manner. In other words, the intermediate electrode member 22 defines the outside of the outer cylinder 3 and the reservoir chamber A from each other in the liquid- and gas-tight manner through the welding between the outer cylinder 3 and the attachment cylinder 23, and by means of the seal ring 24 located between the attachment cylinder 23 and the cover member 25, and the seal ring 28 located between the cover member 25 and the electrode pin 29.

According to the first embodiment, the force (thrust, axial force, preload) acting to press the cover member 25 (and the electrode pin 29) toward the intermediate cylinder 17 is imparted by the threaded engagement between the metal cover 26 of the cover member 25 and the attachment cylinder 23. However, the force may be imparted in another way. For example, the force acting to press the cover member (and the electrode pin) toward the intermediate cylinder may be imparted by press-fitting or caulking the metal cover of the cover member to the attachment cylinder.

The electrode pin 29 as an imparting unit is configured to impart the intermediate cylinder 17 with a voltage (electric field) from the high-voltage driver and the battery 19, which form the voltage supply unit (electric field supply unit). The electrode pin 29 is made of electrically conductive material. The electrode pin 29 is a pin-like member having a circular cross-section and extending in the axial direction. The electrode pin 29 has a distal end side (intermediate cylinder 17 side) in contact (abutment) with the intermediate cylinder 17 (and an extending portion 32 of the ring member 30), and a proximal end side connected to a positive pole of the battery 19 via the high-voltage driver, not shown. The electrode pin 29 is provided in the middle or a portion closer to the distal end with the large diameter portion 29A which is larger in diameter than the other portions. The large diameter portion 29A is fitted in the large diameter portion 27F of the through-bore 27D of the resin cover 27. Along with the threaded engagement between the internal thread portion 23C of the attachment cylinder 23 and the external thread portion 26C of the cover member 25, the large diameter portion 29A is applied by the cover member 25 with a force acting in such a direction that (the distal end of) the electrode pin 29 is pressed against the intermediate cylinder 17. This makes it possible to press the distal end of the electrode pin 29 against the intermediate cylinder 17 and thus improve the stability of a contact between the distal end of the electrode pin 29 and the intermediate cylinder 17.

The ring member 30 is an electrically conductive member which is formed into a ring-like shape, for example, by bending an elongate plate-like member. The ring member 30 is attached to a part of the outer peripheral side of the intermediate cylinder 17 in the axial direction. The ring member 30 is provided with the extending portion 32. In short, the ring member 30 includes the ring portion 31 and the extending portion 32. The ring portion 31 is formed into a substantially ring-like shape with an inner diameter equal to or smaller than an outer diameter of the intermediate cylinder 17 (a segment ring-like shape from which a portion facing the electrode pin 29 of the intermediate electrode member 22 is missing). The ring portion 31 has an axial dimension adequately smaller than an axial dimension of the intermediate cylinder 17. For example, the axial dimension of the ring portion 31 is equal to or larger than the outer diameter of the electrode pin 29 (for example, the axial dimension of the ring portion 31=a value in a range between 1.0 and 1.5, inclusive×the outer diameter of the distal end side of the electrode pin 29). The ring portion 31 is fitted onto the outer diameter side of the intermediate cylinder 17, for example, by press-fitting (light press-fitting). The ring member 30 is thus fixed to the intermediate cylinder 17.

The extending portion 32 is disposed in the outer peripheral side of the intermediate cylinder 17 and extends from the outer peripheral side of the intermediate cylinder 17 toward the outer cylinder 3. The extending portion 32 is inserted with the distal end side of the electrode pin 29 of the intermediate electrode member 22 in an electrically contacted manner. As shown in FIG. 3 in an enlarged way, the extending portion 32 comprises a pair of clamping pieces 32A, 32A which are formed by bending both circumferential ends of the ring portion 31 in the radially outward direction of the ring portion 31. The clamping pieces 32A, 32A, for example, may be curved into a shape of a substantially semi-circular arc so as to cover an outer peripheral surface (so as to be disposed along the outer peripheral surface) of the distal end side of the electrode pin 29. The clamping pieces 32A, 32A may have a flat (flat plate-like) shape. In any case, the distal end side of the electrode pin 29 is inserted between the clamping pieces 32A, 32A into contact with the inner side of the extending portion 32.

In other words, the distal end side of the electrode pin 29 is held by the clamping pieces 32A, 32A from both sides in the radial direction across a central axis so as to be covered by the clamping pieces 32A, 32A. The electrode pin 29 is thus supported by the pair of clamping pieces 32A, 32A, or the extending portion 32, with the distal end portion of the electrode pin 29 in contact with the outer peripheral side of the intermediate cylinder 17. This enables the electrode pin 29 and the intermediate cylinder 17 to remain in a good contact with each other when the hydraulic fluid 20 flows around the distal end side of the electrode pin 29. It is also possible to secure a large contact area between the extending portion 32 and the distal end side of the electrode pin 29 since the distal end side of the electrode pin 29 is inserted in the extending portion 32 having electrical conductivity. This also reduces a contact resistance between the extending portion 32 and the distal end side of the electrode pin 29.

According to the first embodiment, the ring portion 31 of the ring member 30 is fixed to the intermediate cylinder 17 by press-fitting. However, the ring member may be fixed to the intermediate cylinder by welding or caulking. If the ring portion is fixed to the intermediate cylinder by welding or caulking, for example, the ring portion may be formed of an arc-like curved piece which partly extends in the circumferential direction of the intermediate cylinder (for example, a plate-like member curved along the outer peripheral surface of the intermediate cylinder), and the curved piece may be fixed to the intermediate cylinder by welding or caulking. In such a case, for example, the ring member is a partial arc-like member formed of a curved piece. A circumferentially middle portion of the curved piece may be provided, for example, with an extending portion having a circular cylinder-like shape, which extends toward the outer cylinder. In addition, according to the first embodiment, the ring portion 31 of the ring member 30 has the shape of a segment ring. However, for example, the ring portion may have a ring-like shape. In such a case, an outer peripheral surface of the ring-like ring portion may be provided with an extending portion (having a circular cylinder-like shape, for example) which extends toward the outer cylinder.

The shock absorber 1 of the first embodiment is configured as described above. The following description will explain operation of the shock absorber 1.

To install the shock absorber 1 in a vehicle, such as an automobile, for example, the upper end side of the piston rod 8 is fixed to the vehicle body side of the vehicle, and the lower end side (bottom cap 4 side) of the outer cylinder 3 is fixed to the wheel side (axle side). When vertical vibration occurs during vehicle running due to unevenness of a road surface or for another reason, the piston rod 8 is displaced to extend or recede relative to the outer cylinder 3. At this time, a potential difference is generated within the passage 18 in accordance with a command outputted from the controller to control the viscosity of the hydraulic fluid 20, or the electrorheological fluid, which passes through the passage 18, to thereby variably adjust the damping force generated by the shock absorber 1.

For example, on the expansion stroke of the piston rod 8, the contraction-side check valve 6 of the piston 5 is closed in response to movement of the piston 5 within the inner cylinder 2. Prior to the opening of the disc valve 7 of the piston 5, the oil (hydraulic fluid 20) in the rod-side oil chamber B is pressurized to flow into the passage 18 through the oil holes 2A of the inner cylinder 2. The oil in an amount corresponding to the movement of the piston 5 flows from the reservoir chamber A to open the expansion-side check valve 15 of the bottom valve 12 and then enters the bottom-side oil chamber C.

On the contraction stroke of the piston rod 8, the movement of the piston 5 within the inner cylinder 2 opens the contraction-side check valve 6 of the piston 5 and closes the expansion-side check valve 15 of the bottom valve 12. Prior to the opening of the bottom valve 12 (disc valve 16), the oil in the bottom-side oil chamber C enters the rod-side oil chamber B. At the same time, the oil in an amount corresponding to an amount by which the piston rod 8 enters the inner cylinder 2 flows from the rod-side oil chamber B into the passage 18 through the oil holes 2A of the inner cylinder 2.

In either case (on both the expansion and contraction strokes), the oil which has entered the passage 18 passes through the passage 18 toward an outlet side (downwards) at a viscosity corresponding to the potential difference of the passage 18 (potential difference between the intermediate cylinder 17 and the inner cylinder 2) and flows from the passage 18 through the oil passages 14A of the holding member 14 into the reservoir chamber A. A damping force corresponding to the viscosity of the oil passing through the passage 18 is then generated to enable the shock absorber 1 to absorb (reduce) the vertical vibration of the vehicle.

The intermediate cylinder 17 is supplied (applied) with a voltage from the outside of the shock absorber 1 (from the battery 19) via the electrode connector 21. According to the first embodiment, the intermediate cylinder 17 is provided in the outer peripheral side with the extending portion 32 which extends toward the outer cylinder 3. The distal end side of the electrode pin 29 which is the imparting unit is inserted in the extending portion 32 to be in contact with the extending portion 32. In this way, the distal end side of the electrode pin 29 can be supported by the extending portion 32. In other words, the hydraulic fluid 20 flowing through the reservoir chamber A flows around the distal end side of the electrode pin 29 supported by the extending portion 32.

This makes it possible to impart a voltage from the electrode pin 29, which serves as the imparting unit, to the intermediate cylinder 17 with greater stability, as compared to the configuration in which the fluid force of the fluid flowing through the reservoir chamber is directly applied only to the imparting unit (compression spring) as seen in the Patent Literature 1. If the distal end of the electrode pin 29 and the outer peripheral surface of the intermediate cylinder 17 are brought into a direct contact with each other, it is possible to improve the stability of the contact between the distal end of the electrode pin 29 and the outer peripheral surface of the intermediate cylinder 17. Furthermore, since the distal end side of the electrode pin 29 is inserted in the extending portion 32, the contact area between the extending portion 32 and the distal end side of the electrode pin 29 can be increased. This reduces the contact resistance, leading to a decrease in heat generation in a contact region which is an electrical contact point and a reduction in power consumption. Since the electrode pin 29 as the imparting unit is inserted in the extending portion 32 so that the outer peripheral side of the electrode pin 29 comes into contact with the inner peripheral side of the extending portion 32, the distal end of the electrode pin 29 can impart a voltage from the imparting unit to the intermediate cylinder 17 through the extending portion 32 without contact with the intermediate cylinder 17. In other words, according to the first embodiment, the distal end side of the electrode pin 29 comes into a direct contact with both the extending portion 32 and the outer peripheral side (outer peripheral surface) of the intermediate cylinder 17 within the extending portion 32, so that the distal end side of the electrode pin 29 is electrically connected to the extending portion 32 and the intermediate cylinder 17. In this connection, the distal end side of the electrode pin 29 may be brought into a direct contact only with the extending portion 32, without being brought into the direct contact with the outer peripheral side of the intermediate cylinder 17, to be electrically connected to the intermediate cylinder 17 through the extending portion 32.

According to the embodiments, the ring member 30 is partly disposed in the outer peripheral side of the intermediate cylinder 17 in the axial direction, and the ring member 30 is provided with the extending portion 32. Because of this configuration, the extending portion 32 can be provided to the outer peripheral side of the intermediate cylinder 17 without difficulty by attaching the ring member 30 with the extending portion 32 to the intermediate cylinder 17.

According to the embodiments, along with the threaded engagement between the internal thread portion 23C of the attachment cylinder 23 and the external thread portion 26C of the cover member 25, the electrode pin 29 is applied with a force acting in such a direction that the distal end of the electrode pin 29 is pressed against the outer peripheral surface of the intermediate cylinder 17. This improves the stability of the contact between the distal end of the electrode pin 29 and the outer peripheral surface of the intermediate cylinder 17.

Figure 4:
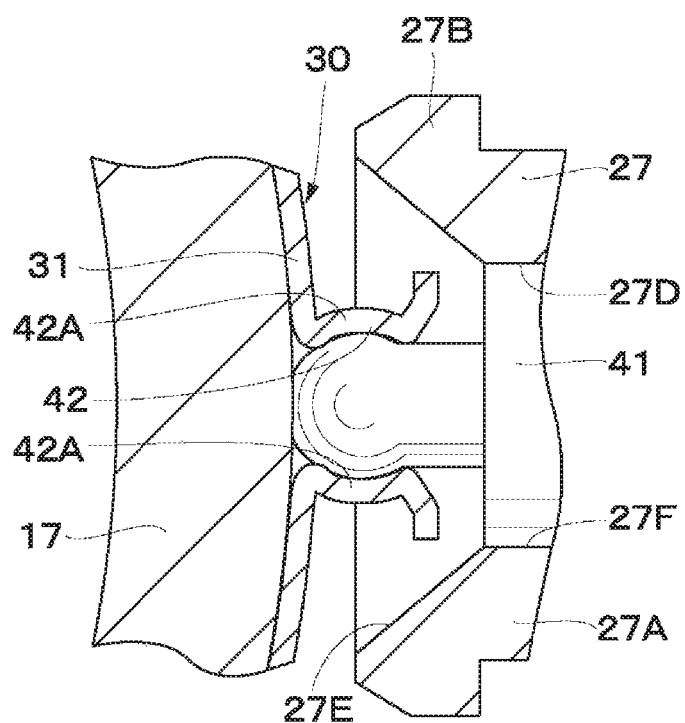
FIG. 4 is an enlarged sectional view of an electrode pin, an extending portion of a ring member, and other components of an electrode connector according to a second embodiment, as viewed from the same direction as FIG. 3.

FIG. 4 shows a second embodiment. The second embodiment is characterized in that a distal end side of an imparting unit is formed into a substantially spherical shape, and that the imparting unit having the substantially spherical shape is inserted in an extending portion. In the second embodiment, similar constituent elements to those of the first embodiment will be provided with the same reference signs, and the description of these constituent elements will be omitted.

The second embodiment utilizes an electrode pin 41 as an imparting unit, instead of the electrode pin 29 of the first embodiment. The electrode pin 41 of the second embodiment has a distal end side having a substantially spherical shape. The second embodiment further utilizes an extending portion 42, instead of the extending portion 32 of the first embodiment. Like the extending portion 32 of the first embodiment, the extending portion 42 of the second embodiment comprises a pair of clamping pieces 42A, 42A which are formed by bending both circumferential ends of a ring portion 31 in the radially outward direction of the ring portion 31. The clamping pieces 42A, 42A are curved into a spherical shape so as to cover a spherical surface (so as to be disposed along the spherical surface) of the distal end side of the electrode pin 29.

According to the second embodiment, the distal end side of the electrode pin 41 thus configured is inserted in the extending portion 42. The second embodiment is not particularly different from the first in basic operation. Due to the spherical shape of the distal end side of the electrode pin 41 and the spherical shape of the clamping pieces 42A, 42A, which serve as the extending portion 42, the second embodiment particularly can increase an allowable range of an insertion angle for the electrode pin 41 relative to the extending portion 42.

In this regard, let us assume that when a cover member 25 inserted with the electrode pin 41 is attached to an attachment cylinder 23, the distal end side of the electrode pin 41 is obliquely inserted between the clamping pieces 42A, 42A as the extending portion 42. In such a situation, if the distal end side of the electrode pin 41 and (the clamping pieces 42A, 42A of) the extending portion 42 are not in the spherical shape, there is a chance, for example, that the distal end side of the electrode pin 41 and the extending portion 42 are applied with a transverse force (for example, a circumferential force, an axial force or a resultant force of the circumferential and axial forces). It is preferable that such a transverse force be small. Since the distal end side of the electrode pin 41 and the extending portion 42 have a spherical shape in the second embodiment, the transverse force is prevented from being applied (unlikely to be applied) to the distal end side of the electrode pin 41 and the extending portion 42 even if the distal end side of the electrode pin 41 is obliquely inserted in the extending portion 42.

Figure 5:
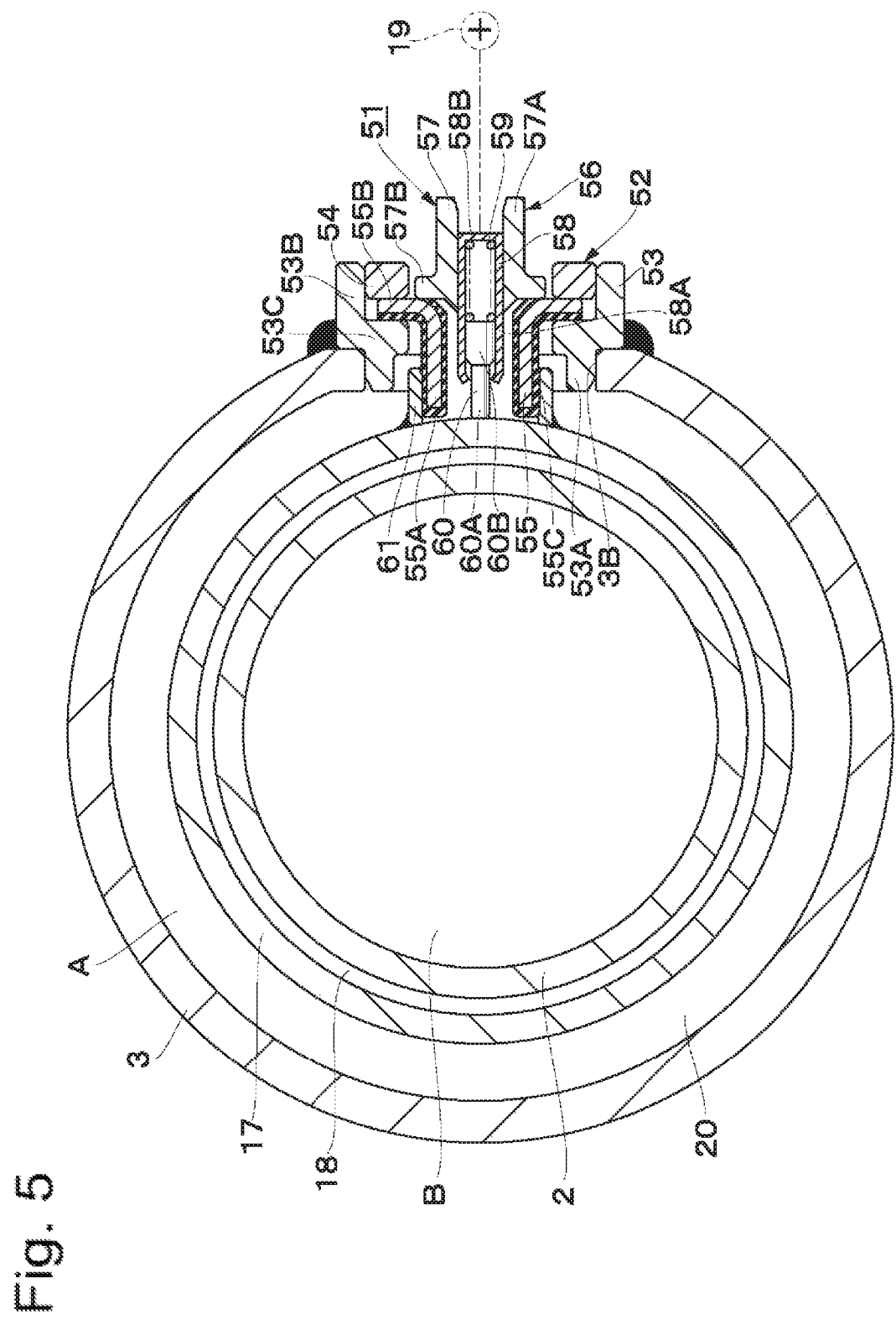
FIG. 5 is a cross-sectional view of an electrode connector and other components according to a third embodiment, as viewed from the same direction as FIG. 2.

FIG. 5 shows a third embodiment. The third embodiment is characterized in that a separating member in which an imparting unit is accommodated is inserted in an extending portion of an outer peripheral side of an intermediate cylinder. In the third embodiment, similar constituent elements to those of the first embodiment will be provided with the same reference signs, and the description of these constituent elements will be omitted. As in FIG. 2, FIG. 5 omits the members (piston rod 8 and the other members) disposed within the inner cylinder 2.

The third embodiment utilizes an electrode connector 51, instead of the electrode connector 21 of the first embodiment. The electrode connector 51 includes an intermediate electrode member 52 attached to an outer cylinder 3 and a circular cylinder member 61 attached to an intermediate cylinder 17. The intermediate electrode member 52 includes an attachment cylinder 53, a press-fitted ring 54, a joint member 55 as a separating member, and an electrode assembled body 56.

The attachment cylinder 53 is fixed to an attachment hole 3B of the outer cylinder 3. The attachment cylinder 53 includes a small-diameter cylinder portion 53A inserted in the attachment hole 3B, a large-diameter cylinder portion 53B having a larger diameter than the small-diameter cylinder portion 53A, and a connecting portion 53C shaped like a stepped portion (flange), which connects the small-diameter cylinder portion 53A and the large-diameter cylinder portion 53B to each other and radially extends over the entire periphery. According to the third embodiment shown in FIG. 5, a region around the attachment hole 3B of the outer cylinder 3 is made flat relative to an outer peripheral surface (flattened toward an inner diameter side) of the outer cylinder 3, and one lateral surface (inner surface, that is, a lateral surface on the intermediate cylinder 17 side) of the connecting portion 53C of the attachment cylinder 53 is in abutting contact with the flat region.

The circular cylinder member 61 and a cylinder portion 55A of the joint member 55 are inserted in an inner diameter side of the small-diameter cylinder portion 53A so as to be located away (leaving a space) from an inner peripheral surface of the small-diameter cylinder portion 53A. The cylinder portion 55A of the joint member 55 is inserted in an inner diameter side of the connecting portion 53C so as to be located away (leaving a space) from an inner peripheral surface of the connecting portion 53C. A flange portion 55B of the joint member 55 is inserted in an inner diameter side of the large-diameter cylinder portion 53B so as to be located away (leaving a space) from an inner peripheral surface of the large-diameter cylinder portion 53B. The press-fitted ring 54 is press-fitted to the inner diameter side of the large-diameter cylinder portion 53B adjacently to the flange portion 55B of the joint member 55.

Along with the press-fitting of the press-fitted ring 54 into the large-diameter cylinder portion 53B, the flange portion 55B of the joint member 55 is applied with a force acting to press the flange portion 55B against the other lateral surface (outer surface, that is, a lateral surface on the opposite side to the intermediate cylinder 17 side) of the connecting 53C. The outer peripheral surface of the outer cylinder 3 and an outer peripheral surface of the connecting portion 53C or of the large-diameter cylinder portion 53B are welded (over the entire periphery) with the small-diameter cylinder portion 53A inserted in the attachment hole 3B and with the one lateral surface of the connection portion 53C in abutting contact with the region around the attachment hole 313 of the outer cylinder 3. This way, the attachment cylinder 53 is attached to the outer cylinder 3 in the liquid- and gas-tight manner.

The press-fitted ring 54 has a ring-like shape. For example, an outer diameter of the press-fitted ring 54 is made equal to or larger than an inner diameter of the large-diameter cylinder portion 53B of the attachment cylinder 53, and this enables the press-fitted ring 54 to be press-fitted to (the large-diameter cylinder portion 53B of) the attachment cylinder 53. The press-fitted ring 54 is fixed to (the large-diameter cylinder portion 53B of) the attachment cylinder 53 while being applied with a force acting to press the flange portion 55B of the joint member 55 against the connecting portion 53C of the attachment cylinder 53. An elastic body 55C on the one lateral surface (inner surface, that is, the lateral surface on the intermediate cylinder 17 side) of the flange portion 55B of the joint member 55 is thus axially compressed (squeezed and elastically deformed) between the press-fitted ring 54 and the connecting portion 53C, thereby sealing a gap between the flange portion 55B of the joint member 55 and (the connecting portion 53C of) the attachment cylinder 53 in the liquid- and gas-tight manner. According to the third embodiment, the press-fitted ring 54 is fitted in the attachment cylinder 53 by press-fitting. However, for example, an end portion (end portion on the opposite side to the intermediate cylinder 17 side) of the large-diameter cylinder portion 53B of the attachment cylinder 53 may be folded (caulked) toward the inner diameter side. More specifically, the end portion of the large-diameter cylinder portion 53B may be bent (caulked) in part (or whole) in a circumferential direction toward the inner diameter side to press the flange portion 55B of the joint member 55 against the connecting portion 53C of the attachment cylinder 53. It is also possible to threadedly engage the press-fitted ring 54 and the large-diameter cylinder portion 53B with each other.

The joint member 55 is configured to accommodate an electrode pin 60, which serves as an imparting unit in consort with the circular cylinder member 61. The joint member 55 defines (separates) the electrode pin 60 and the reservoir chamber A from each other in the liquid- and gas-tight manner. The joint member 55 is formed into a flanged circular cylinder member having a substantially L-shaped longitudinal section. To be more specific, the joint member 55 includes the cylinder portion 55A having a circular cylinder-like shape and the flange portion 55B protruding from the end portion (end portion on the opposite side to the intermediate cylinder 17 side) of the cylinder portion 55A in the radially outward direction over the entire periphery. The joint member 55 is covered with the elastic body (seal member) 55C made of high-polymer material (rubber material including synthetic rubbers, resin material including synthetic resins) in a major part of a surface thereof. The joint member 55, except the other lateral surface (outer lateral surface, that is, a lateral surface on the opposite side to the intermediate cylinder 17 side), is therefore covered with the elastic body 55C formed, for example, by baking rubber. According to the present embodiment, the joint member 55 has an end extending close to the intermediate cylinder 17. However, the joint member 55 and the circular cylinder member 61 may be used to define the electrode pin 60 from the reservoir chamber A in the liquid- and gas-tight manner.

The cylinder portion 55A of the joint member 55 is fitted in (an inner peripheral side of) the circular cylinder member 61. The elastic body 55C of the cylinder portion 55A in a free state has an outer diameter which is larger than the inner diameter of the circular cylinder member 61. The elastic body 55C of the cylinder portion 55A is thus radially compressed (squeezed, elastically deformed) between the inner peripheral surface of the circular cylinder member 61 and the cylinder portion 55A with the cylinder portion 55A of the joint member 55 fitted in the circular cylinder member 61. A gap between the outer peripheral surface of the cylinder portion 55A of the joint member 55 and the inner peripheral surface of the circular cylinder member 61 is accordingly sealed in the liquid- and gas-tight manner. According to the present embodiment, the cylinder portion 55A of the joint member 55 is fitted to the inner peripheral side of the circular cylinder member 61. However, the cylinder portion 55A of the joint member 55 may be fitted to the outer peripheral side of the circular cylinder member 61.

The electrode assembled body 56 is inserted in the joint member 55. The electrode assembled body 56 includes a positioning cylinder member 57, an electrode-supporting cylinder member 58, an elastic member 59, and the electrode pin 60. The positioning cylinder member 57 has a flanged circular cylinder-like shape. The positioning cylinder member 57 includes a cylinder portion 57A having a circular cylinder-like shape and a flange portion 57B protruding from an end portion (end portion on the intermediate cylinder 17 side) of the cylinder portion 57A in the radially outward direction over the entire periphery. The electrode-supporting cylinder member 58 is inserted (for example, press-fitted) in the cylinder portion 57A. The flange portion 57B is in abutting contact with the other lateral surface of the flange portion 55B of the joint member 55. This abutment regulates the position of the electrode-supporting cylinder member 58 in relation to the intermediate cylinder 17

(distance to the intermediate cylinder 17). In this case, the position of the electrode-supporting cylinder member 58 in relation to the intermediate cylinder 17 is so regulated that an distal end side of the electrode pin 60 is in contact (abutment) with the outer peripheral surface of the intermediate cylinder 17 with the elastic member 59 elastically deformed (compressed).

The electrode-supporting cylinder member 58 is fixed to the inner side of the positioning cylinder member 57. The electrode-supporting cylinder member 58 is made, for example, of electrically conductive material and has a cylindrical shape. The electrode-supporting cylinder member 58 includes a cylinder portion 58A having a circular cylinder-like shape and a bottom portion 58B which closes one end side (outer end side, that is, the opposite side to the intermediate cylinder 17 side) of the cylinder portion 58A. The electrode-supporting cylinder member 58 is inserted with the elastic member 59 and the electrode pin 60. An opening of the cylinder portion 58A, which is located on the other end side (inner end side, that is, the intermediate cylinder 17 side), is decreased in diameter. This prevents the electrode pin 60 from slipping out of the electrode-supporting cylinder member 58. The bottom portion 58B is connected to a positive pole of a battery 19 via a high-voltage driver, not shown.

The elastic member 59 as a biasing device is inserted in the electrode-supporting cylinder member 58 and located on a rear surface side of the electrode pin 60 (the opposite side to the intermediate cylinder 17 side) of the electrode pin 60. The elastic member 59 is formed, for example, of a compression spring. The elastic member 59 presses the electrode pin 60 toward the intermediate cylinder 17. In short, the elastic member 59 is disposed in the rear surface of the electrode pin 60 and biases the electrode pin 60 toward the intermediate cylinder 17. The distal end side of the electrode pin 60 abuts against the outer peripheral surface of the intermediate cylinder 17, and the elastic member 59 is compressed (elastically deformed), with the flange portion 57B of the positioning cylinder member 57 in abutting contact with the flange portion 55B of the joint member 55.

The electrode pin 60 as the imparting unit is configured to impart the intermediate cylinder 17 with the voltage (electric field) outputted from the battery 19, which serves as a voltage supply unit (electric field supply unit). The electrode pin 60 is made of electrically conductive material. The electrode pin 60 is a pin-like member having a circular cross-section and extending in the axial direction. The electrode pin 60 has the distal end side (intermediate cylinder 17 side) in contact (abutment) with the outer peripheral surface of the intermediate cylinder 17. The electrode pin 60 is pressed against the outer peripheral surface of the intermediate cylinder 17 by the elastic member 59.

The electrode pin 60 has a shape like a stepped column. More specifically, the distal end side of the electrode pin 60 is a small-diameter portion 60A, and a proximal end side of the electrode pin 60 is a large-diameter portion 60B. The small-diameter portion 60A has an outer diameter smaller than an inner diameter of the opening of the other end side of the cylinder portion 58A of the electrode-supporting cylinder member 58, whereas the large-diameter portion 60B has an outer diameter larger than the inner diameter of the opening of the other end side of the cylinder portion 58A of the electrode-supporting cylinder member 58. The electrode pin 60 is therefore prevented from slipping out of the electrode-supporting cylinder member 58.

The circular cylinder member 61 as the extending portion is disposed in the outer peripheral side of the intermediate cylinder 17 and extends from the outer peripheral side of the intermediate cylinder 17 toward the outer cylinder 3. The circular cylinder member 61 is attached to the outer peripheral surface of the intermediate cylinder 17 in such a position as to face the attachment hole 3B of the outer cylinder 3. The circular cylinder member 61 is fixed (secured) by welding onto the outer peripheral surface of the intermediate cylinder 17. The circular cylinder member 61 has a circular cylinder-like shape. The electrode pin 60, which serves as the imparting unit, is inserted in the circular cylinder member 61 in an electrically contacted manner. The distal end side of the electrode pin 60 is not in a direct contact with the circular cylinder member 61 within the circular cylinder member 61 which is the extending portion, but in a direct contact only with the outer peripheral side (outer peripheral surface) of the intermediate cylinder 17 to be electrically connected to the intermediate cylinder 17. The joint member 55 for accommodating the electrode pin 60 is also inserted in the circular cylinder member 61 to be located on the outer peripheral side of the electrode pin 60. The cylinder portion 55A of the joint member 55 is thus fitted in the inner diameter side of the circular cylinder member 61. The elastic body 55C of the cylinder portion 55A is radially compressed (squeezed, elastically deformed) between the cylinder portion 55A and the inner peripheral surface of the circular cylinder member 61. Accordingly, a gap between the inner peripheral surface of the circular cylinder member 61 and the outer peripheral surface of the cylinder portion 55A of the joint member 55 is sealed in the liquid- and gas-tight manner.

According to the third embodiment, the circular cylinder member 61 as the imparting unit is attached directly to the outer peripheral surface of the intermediate cylinder 17. Instead of that, for example, it is also possible to place a ring member in an outer peripheral side of an intermediate cylinder so that the ring member partly extends in the axial direction, and form (a circular cylinder member which is) an extending portion in the ring member. In such a case, the ring member may be fixed to the intermediate cylinder by press-fitting, welding or The third embodiment supplies (applies) a voltage to the intermediate cylinder 17 through the electrode connector 51 described above. The third embodiment is not particularly different from the first in basic operation.

According to the third embodiment, more specifically, the circular cylinder member 61 is disposed in the outer peripheral side of the intermediate cylinder 17. The circular cylinder member 61 is the extending portion which extends toward the outer cylinder 3. The circular cylinder member 61 is inserted with the electrode pin 60 and the joint member 55. The electrode pin 60 therefore can be enclosed with the circular cylinder member 61 and the joint member 55. This makes it possible to use the circular cylinder member 61 and the joint member 55 to receive the fluid force of the hydraulic fluid 20 flowing through the reservoir chamber A. Consequently, the voltage is stably imparted from the electrode pin 60 to the intermediate cylinder 17. In addition, the stability of the contact between the electrode pin 60 and the intermediate cylinder 17 is also improved.

According to the third embodiment, the joint member 55 which is the separating member liquid-tightly defines the electrode pin 60 and the reservoir chamber A from each other. The electrode pin 60 therefore can be separated from the hydraulic fluid 20 flowing through the reservoir chamber A, so that the electrode pin 60 can be prevented from being applied with the fluid force of the hydraulic fluid 20 flowing through the reservoir chamber A. This also improves the stability in imparting the voltage and the stability of the contact between the electrode pin 60 and the intermediate cylinder 17.

According to the third embodiment, the elastic member 59 is disposed in the rear surface of the electrode pin 60 which is the pin-like member. The elastic member 59 is the biasing device configured to bias the electrode pin 60 toward the intermediate cylinder 17. The electrode pin 60 therefore can be pressed against the intermediate cylinder 17 by the elastic member 59. This also improves the stability of the contact between the electrode pin 60 and the intermediate cylinder 17. The third embodiment illustrates the configuration in which the joint member 55 is inserted in the circular cylinder member 61 to be fitted to the inner periphery of the circular cylinder member 61. Instead of that, the joint member 55 may be fitted to the outer, periphery of the circular cylinder member 61. Although the third embodiment includes the electrode pin 60 as the imparting unit, the compression spring disclosed in the patent literature could provide a similar advantageous effect.

Figure 6:
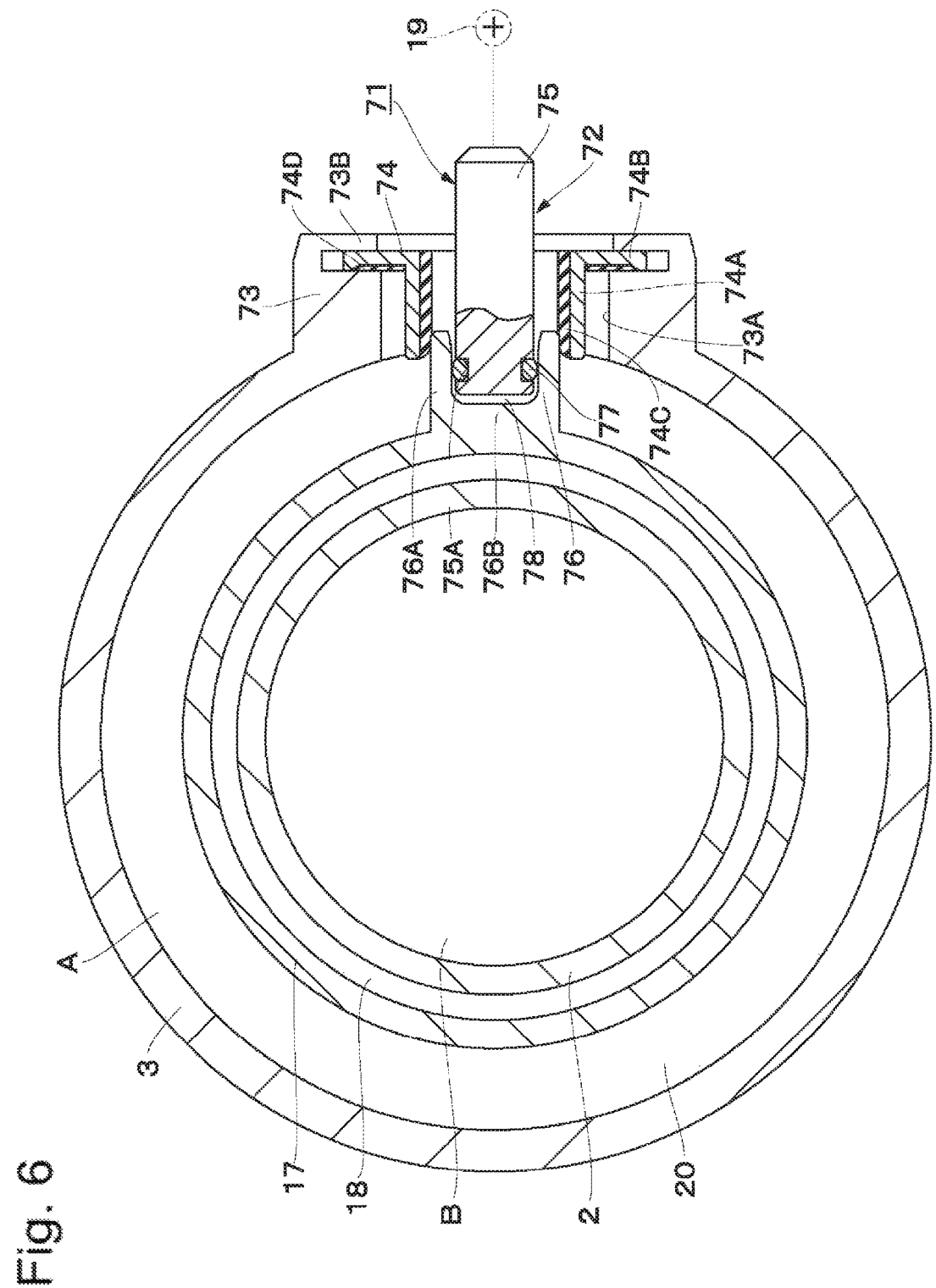
FIG. 6 is a cross-sectional view of an electrode connector and other components according to a fourth embodiment, as viewed from the same direction as FIG. 2.

FIG. 6 shows a fourth embodiment. The fourth embodiment is characterized in that an extending portion and an imparting unit are located opposite to each other, leaving a space therebetween, and that a conducting device is disposed between the extending portion and the imparting portion. In the fourth embodiment, similar constituent elements to those of the first embodiment will be provided with the same reference signs, and the description of these constituent elements will be omitted.

The fourth embodiment utilizes an electrode connector 71, instead of the electrode connector 21 of the first embodiment. The electrode connector 71 includes an intermediate electrode member 72 disposed on an outer cylinder 3 side, and a circular cylinder portion 76 as an extending portion disposed on an intermediate cylinder 17 side. The intermediate electrode member 72 includes an attachment cylinder 73, a joint member 74 as a separating member, and an electrode pin 75 as an imparting unit.

The attachment cylinder 73 is disposed in the outer peripheral side of the outer cylinder 3 integrally with the outer cylinder 3 so as to protrude from the outer peripheral side of the outer cylinder 3 in the radially outward direction. The attachment cylinder 73 has a circular cylinder-like shape. The inner side of the attachment cylinder 73 is an electrode hole 73A inserted with the joint member 74 and the electrode pin 75. The attachment cylinder 73 has an end portion (end portion on the opposite side to the intermediate cylinder 17 side, namely, a right-side end portion in FIG. 6) which is a caulked portion 73B. The caulked portion 73B is folded toward an inner diameter side in part or whole in a circumferential direction. The caulked portion 73B presses a flange portion 74B of the joint member 74 toward the intermediate cylinder 17 to prevent the joint member 74 from coming off from the attachment cylinder 73.

The joint member 74 accommodates the electrode pin 75 which forms the imparting unit in consort with the circular cylinder portion 76. The joint member 74 is disposed on an outer peripheral side of the circular cylinder portion 76 to define (separate) the electrode pin 75 and the reservoir chamber A from each other in the liquid- and gas-tight manner. The joint member 74 is formed into a flanged circular cylinder member having a substantially L-shaped longitudinal section. The joint member 74 therefore includes a cylinder portion 74A having a circular cylinder-like shape and a flange portion 74B protruding from an end portion (end portion on the opposite side to the intermediate cylinder 17 side) of the cylinder portion 74A in the radially outward direction over the entire periphery. Two places on the surface of the joint member 74 are covered with elastic bodies (seal members) 74C and 74D. The elastic bodies 74C and 74D are made of high-polymer material (rubber material including synthetic rubbers, resin material including synthetic resins). To be more specific, the elastic body 74C having a circular cylinder-like shape is disposed in an inner peripheral surface of the cylinder portion 74A, for example, by baking rubber. The elastic body 74D having a ring-like shape is disposed in one lateral surface (inner lateral surface, that is, a lateral surface on the intermediate cylinder 17 side) of the flange portion 74B, for example, by baking rubber.

The cylinder portion 74A of the joint member 74 is fitted in (the outer peripheral side of) the circular cylinder portion 76. The circular cylindrical elastic body 74C of the cylinder portion 74A in a free state has an inner diameter smaller than an outer diameter of the circular cylinder portion 76. In other words, the circular cylindrical elastic body 74C of the cylinder portion 74A is radially compressed (squeezed, elastically deformed) between an outer peripheral surface of the circular cylinder portion 76 and the cylinder portion 74A with the cylinder portion 74A of the joint member 74 fitted in the circular cylinder portion 76. A gap between the inner peripheral surface of the cylinder portion 74A of the joint member 74 and the outer peripheral surface of the circular cylinder portion 76 is thus sealed in the liquid- and gas-tight manner. At the same time, the ring-like elastic body 74D of the flange portion 74B of the joint member 74 is pressed by the caulked portion 73B of the attachment cylinder 73 to be compressed, thereby sealing a gap between the one lateral surface of the flange portion 74B of the joint member 74 and the electrode hole 73A of the attachment cylinder 73 in the liquid- and gas-tight manner. The elastic bodies 74C and 74D may be any material as long as they seal the hydraulic fluid 20 and working gas (gas) within the reservoir chamber A in the liquid- and gas-tight manner. The elastic bodies 74C and 74D may be made, for example, of resin, such as silicone, instead of rubber. According to the present embodiment, the flange portion 74B of the joint member 74 is pressed by the caulked portion 73B toward the intermediate cylinder 17 side. However, the flange portion 74B may be pressed by press-fitting or threaded engagement of a ring as in the third embodiment.

The electrode pin 75 as the imparting unit is connected to a battery 19 via a high-voltage driver. The electrode pin 75 is configured to impart a voltage (electric field) to the intermediate cylinder 17. The electrode pin 75 is made of electrically conductive material. The electrode pin 75 is a pin-like member having a circular cross-section and extending in the axial direction. The electrode pin 75 has a distal end side (intermediate cylinder 17 side) provided with a recessed groove 75A which is recessed in the radially inward direction over the entire periphery. An annular spring 77 as a conducting device is placed in the recessed groove 75A. Instead of having the annular shape, for example, the spring 77 may comprise a plurality of springs 77 spaced at intervals.

The circular cylinder portion 76 as the extending portion is disposed in the outer peripheral side of the intermediate cylinder 17 and extends from the outer peripheral side of the intermediate cylinder 17 toward the outer cylinder 3. The circular cylinder portion 76 is disposed in the outer peripheral surface of the intermediate cylinder 17 in such a position as to face the attachment cylinder 73 of the outer cylinder 3. In such a case, the circular cylinder portion 76 is formed integrally with the intermediate cylinder 17 to have a bottomed circular cylinder-like shape. In other words, the circular cylinder portion 76 includes a cylinder portion 76A having a circular cylinder-like shape and a bottom portion 76B which has a thickness larger than a wall thickness of the intermediate cylinder 17 to close the cylinder portion 76A. The cylinder portion 74A of the joint member 74 is fitted in an outer diameter side of the circular cylinder portion 76. The circular cylindrical elastic body 74C of the cylinder portion 74A is radially compressed between the elastic body 74C and the outer peripheral surface of the circular cylinder portion 76, thereby sealing a gap between an outer peripheral surface of the circular cylinder portion 76 and the inner peripheral surface of the cylinder portion 74A in the liquid- and gas-tight manner.

The electrode pin 75, which serves as the imparting unit, is inserted in the circular cylinder portion 76 in an electrically contacted manner. There is a gap 78 between the circular cylinder portion 76 and the electrode pin 75. The electrode pin 75 does not directly contact the intermediate cylinder 17 including the circular cylinder portion 76 within the circular cylinder portion 76. The electrode pin 75 is located across the gap 78 from the intermediate cylinder 17 including the circular cylinder portion 76. The electrode pin 75 is located away from the circular cylinder portion 76 both in the axial and radial directions. The annular spring 77 as the conducting device is disposed between the circular cylinder portion 76 and the electrode pin 75 so as to stuff the gap 78 (bridge the gap 78). The present embodiment illustrates the configuration in which the annular spring 77 is disposed to stuff the gap 78. This configuration is intended to bring the annular spring 77 into a multi-point contact, so that the annular spring 77 does not necessarily have to stuff the gap 78 over the entire circumference.

The annular spring 77 is configured to electrically connect the electrode pin 75 and the circular cylinder portion 76 to each other. The annular spring 77 is formed, for example, of an electrically-conductive metal spring member which has a shape of a segment ring (substantially C-like shape). The annular spring 77 is fitted in the recessed groove 75A of the electrode pin 75. The electrode pin 75 is inserted in the circular cylinder portion 76 with the annular spring 77 fitted in the recessed groove 75A. The annular spring 77 is consequently squeezed (reduced in diameter) into the circular cylinder portion 76, which brings the electrode pin 75 and the circular cylinder portion 76 into electrical connection (conduction). The annular spring 77 is therefore positionally restrained within the recessed groove 75A, which prevents or reduces the possibility of poor conduction caused by vibration. Furthermore, a circumferential contact of the annular spring 77 with the electrode pin 75 and the circular cylinder portion 76 ensures contact area, improving contact reliability and reducing contact resistance. If the annular spring 77 is an annular spring (coil spring) with a plurality of coils (windings), this provides contact points corresponding to the number of coils by which the annular spring is squeezed. This also improves the contact reliability and reduces the contact resistance. If the annular spring 77 is formed of a coil spring, the annular spring 77 (coil spring) may be disposed within the recessed groove 75A so that an axial center line of the coil spring extends along the recessed groove 75A (so that the axial center line forms a ring-like shape).

The fourth embodiment supplies (applies) a voltage to the intermediate cylinder 17 through the electrode connector 71 described above. The fourth embodiment is not particularly different from the third in basic operation.

Especially in the fourth embodiment, there is the gap 78 between the electrode pin 75 and the circular cylinder portion 76. The annular spring 77 for electrically connecting the electrode pin 75 and the circular cylinder portion 76 together is disposed in the gap 78 so as to stuff the gap 78. The annular spring 77 therefore improves the stability of an electrical contact (conducted state) between the electrode pin 75 and the circular cylinder portion 76. The elastic deformation of the annular spring 77 between the circular cylinder portion 76 and the electrode pin 75 restrains the position of the annular spring 77, preventing or reducing the possibility of poor conduction caused by vibration. It is then possible to improve the contact reliability and reduce the contact resistance.

According to the fourth embodiment, a contact point of the electrode pin 75 (a contact point between the annular spring 77 and the electrode pin 75, a contact point between the annular spring 77 and the circular cylinder portion 76) is separated from the reservoir chamber A by the circular cylinder portion 76 and the joint member 74. Therefore, even if poor conduction occurs at the contact point of the electrode pin 75, the hydraulic fluid and working gas (gas) within the reservoir chamber A is hardly impacted by the poor conduction.

Figure 7:
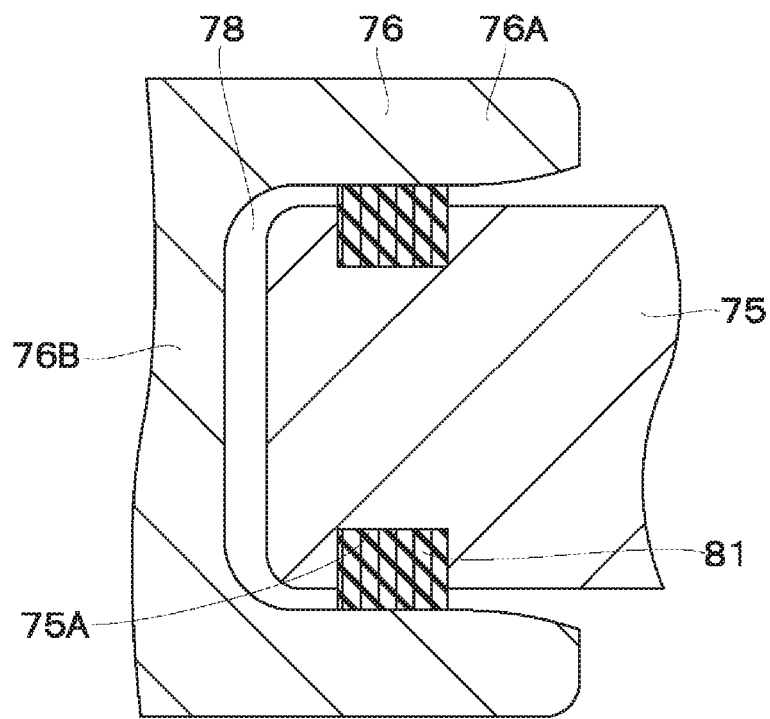
FIG. 7 is a sectional view of a relevant part including an imparting unit, a conducting device, and other components according to a first modification.

The fourth embodiment has been explained with an example in which the annular spring 77 made of metal is placed as a conducting device in the recessed groove 75A of the electrode pin 75. Instead of the annular spring 77, for example, an annular electrically-conductive rubber 81 may be placed as a conducting device in the recessed groove 75A of the electrode pin 75 as in a first modification shown in FIG. 7. In such a case, the electrically conductive rubber 81 is configured to be compressed in the radial direction when the electrode pin 75 is inserted in the circular cylinder portion 76 with the electrically conductive rubber 81 fitted in the recessed groove 75A.

Figure 8:
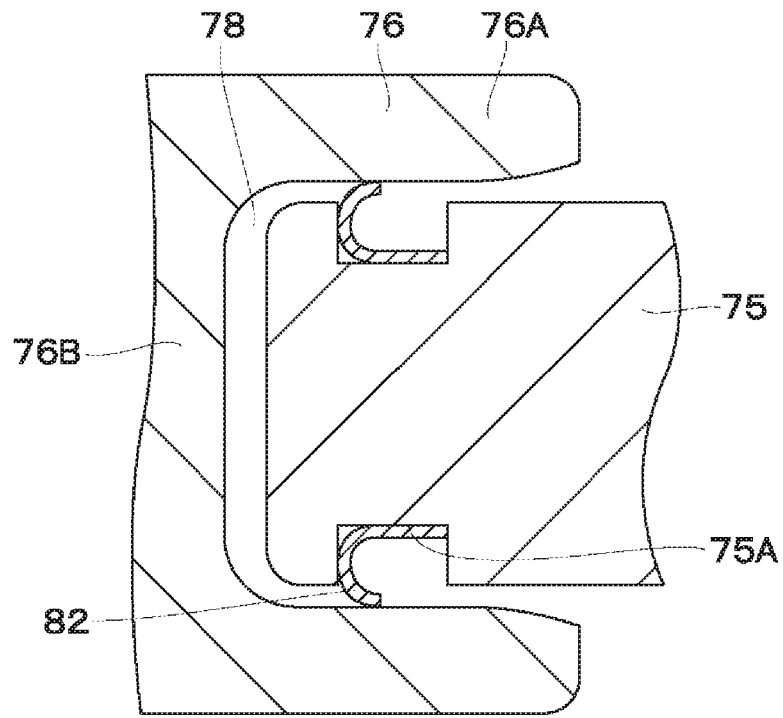
FIG. 8 is a sectional view of a relevant part including an imparting unit, a conducting device, and other components according to a second modification.

For example, as in a second modification shown in FIG. 8, a leaf spring 82 may be placed as a conducting device in the recessed groove 75A of the electrode pin 75. The leaf spring 82 has a section shaped like a substantially J, a distal end side (outer diameter side) of which protrudes from the recessed groove 75A toward the inner peripheral surface side of the circular cylinder portion 76. In this case, too, a distal end side of the leaf spring 82 is reduced in diameter when the electrode pin 75 is inserted in the circular cylinder portion 76 with the leaf spring 82 fitted in the recessed groove 75A.

Figure 9:
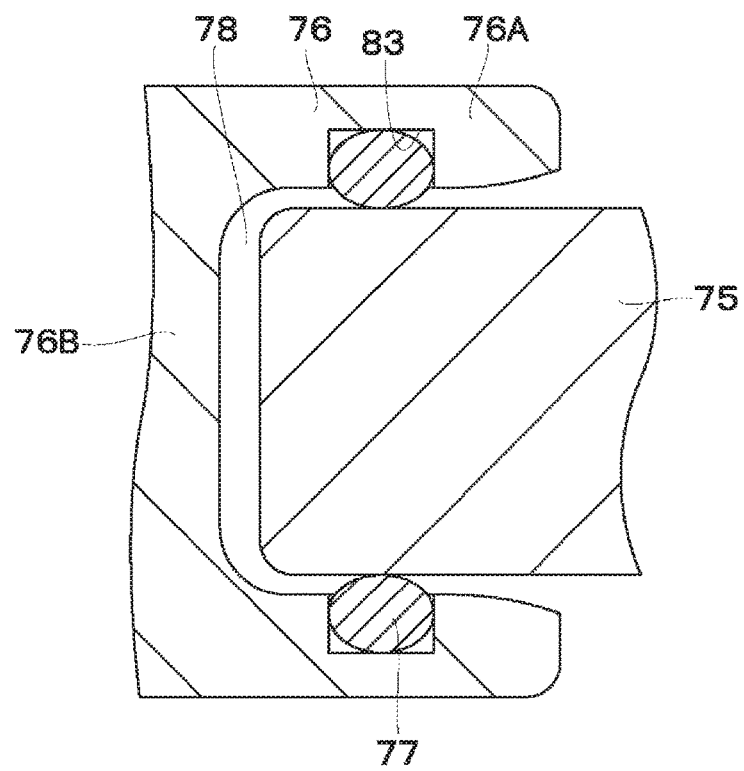
FIG. 9 is a sectional view of a relevant part including an imparting unit, a conducting device, and other components according to a third modification.

The fourth embodiment has been explained with an example in which the recessed groove 75A for receiving the annular spring 77 is formed in the outer peripheral surface of the electrode pin 75. However, for example, if the electrode pin is thin or difficult to be machined, it is too much trouble to form the recessed groove in such an electrode pin. To solve this, for example, as in a third modification shown in FIG. 9, a recessed groove 83 is formed in an inner surface of a cylinder portion of the circular cylinder portion 76, and the annular spring 77 is placed in the recessed groove 83. In this case, the electrode pin 75 is inserted in the circular cylinder portion 76 with the annular spring 77 fitted in the recessed groove 83 of the circular cylinder portion 76. At this time, the annular spring 77 is enlarged in diameter by the electrode pin 75 to bring the electrode pin 75 and the circular cylinder portion 76 into electrical connection (conduction). The third modification thus configured makes it possible to create the conducted state which is similar to the conducted state created in the fourth embodiment, without attaching the annular spring 77 onto the electrode pin 75.

Figure 10:
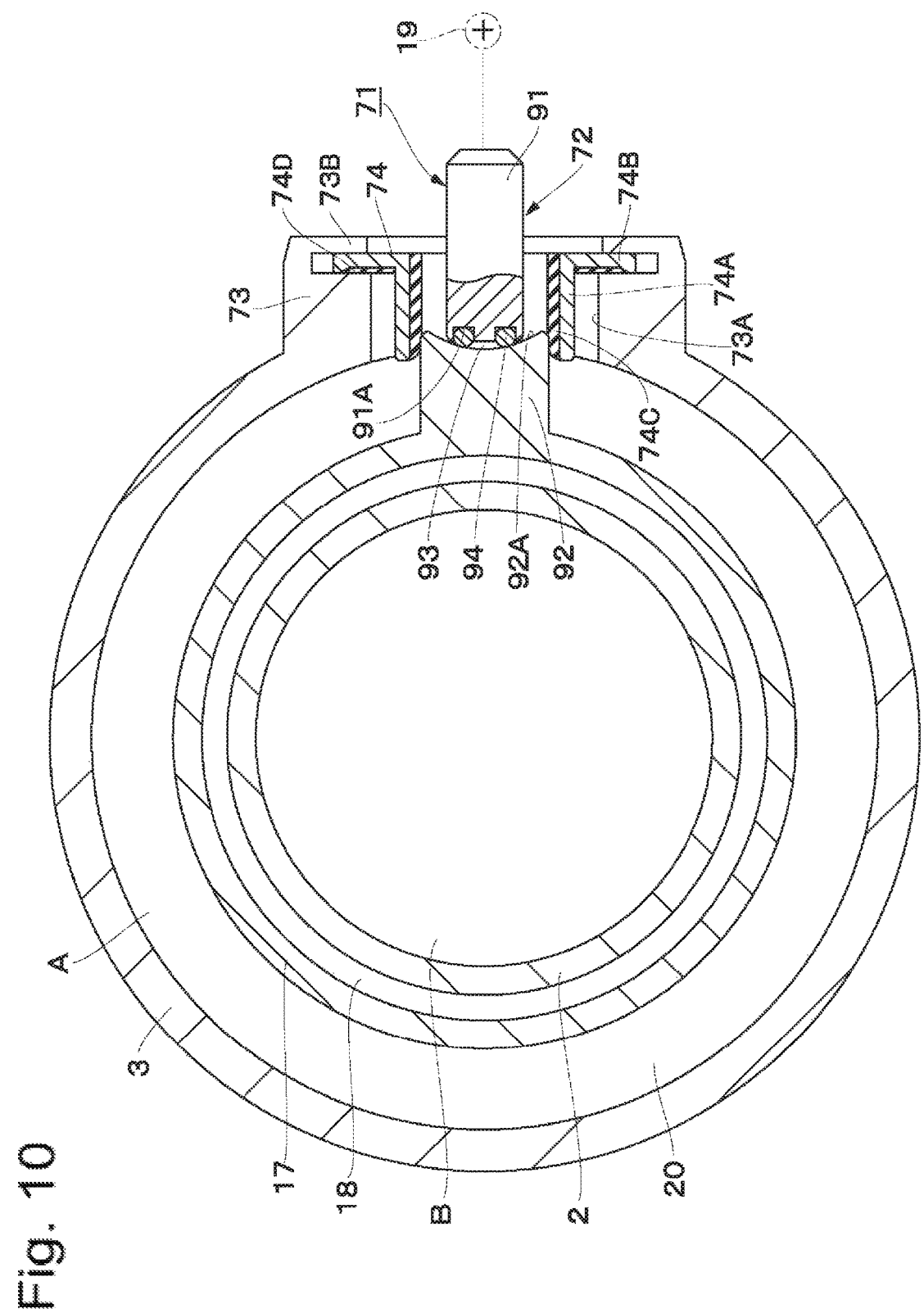
FIG. 10 is a cross-sectional view of an electrode connector and other components according to a fifth embodiment, as viewed from the same direction as FIG. 2.

FIG. 10 shows a fifth embodiment. The fifth embodiment is characterized in that a conducting device is disposed in an axially-extending gap between an imparting unit and an intermediate cylinder. In the fifth embodiment, similar constituent elements to those of the first and fourth embodiments will be provided with the same reference signs, and the description of these constituent elements will be omitted.

An electrode pin 91, which serves as the imparting unit, is made of electrically conductive material. The electrode pin 91 is formed into a pin-like member having a circular cross-section and extending in the axial direction. The electrode pin 91 has a distal end surface (end surface on an intermediate cylinder 17 side) which is provided with an annular recessed groove 91A. Placed in the recessed groove 91A is an annular spring 94, which serves as a conducting device.

A column portion 92 as an extending portion is disposed in an outer peripheral side of the intermediate cylinder 17 and extends from the outer peripheral side of the intermediate cylinder 17 toward the outer cylinder 3. The column portion 92 is disposed in such a position in the outer peripheral surface of the intermediate cylinder 17 so as to face the attachment cylinder 73 of the outer cylinder 3. The column portion 92 is formed integrally with the intermediate cylinder 17. The column portion 92 has a distal end portion (end portion on the opposite side to the intermediate cylinder 17 side) which is provided with a recessed portion 92A. The recessed portion 92A is recessed in an arc-like shape toward the intermediate cylinder 17. The electrode pin 91 which is the imparting unit is inserted in the recessed portion 92A of the column portion 92 in an electrically contacted manner. There is a gap 93 between the recessed portion 92A of the column portion 92 and the electrode pin 91. The gap 93 is disposed in an axially-extending space between the electrode pin 91 and the intermediate cylinder 17. An annular spring 94 as a conducting device is disposed between the column portion 92 and the electrode pin 91 so as to stuff the gap 93 (bridge the gap 93).

The annular spring 94 is configured to electrically connect the electrode pin 91 and the column portion 92 to each other. The annular spring 94 is formed, for example, of an electrically-conductive metal spring member which has a shape of a segment ring (substantially C-like shape). The annular spring 94 is fitted in the recessed groove 91A of the electrode pin 91. The electrode pin 91 is pressed against a recessed surface of the recessed, portion 92A of the column portion 92 with the annular spring 94 fitted in the recessed groove 91A. At this time, the electrode pin 75 and the circular cylinder portion 76 comes into an electrical contact (conducted state) while the annular spring 94 is elastically deformed in the axial direction due to the abutment with the recessed surface of the recessed portion 92A.

The fifth embodiment supplies (applies) a voltage to the intermediate cylinder 17 through the electrode pin 91, the column portion 92, and the annular spring 94, which are configured as described above. The fifth embodiment is not particularly different from the fourth in basic operation.

Especially in the fifth embodiment, the gap 93 between the electrode pin 91 and the column portion 92 is provided in the axially-extending space between the electrode pin 91 and the intermediate cylinder 17. The gap 93 in the axially-extending space absorbs tolerance between the intermediate cylinder 17 including the column portion 92 and the electrode pin 91. Even if the electrode pin 91 is disposed obliquely to a central axis of the column portion 92, the electrode pin 91 and the column portion 92 can be brought into a conducted state through the annular spring 94. Regardless of an angle (insertion angle) of the electrode pin 91, conduction can be achieved by the annular spring 94. Assemblability is accordingly enhanced.

Figure 11:
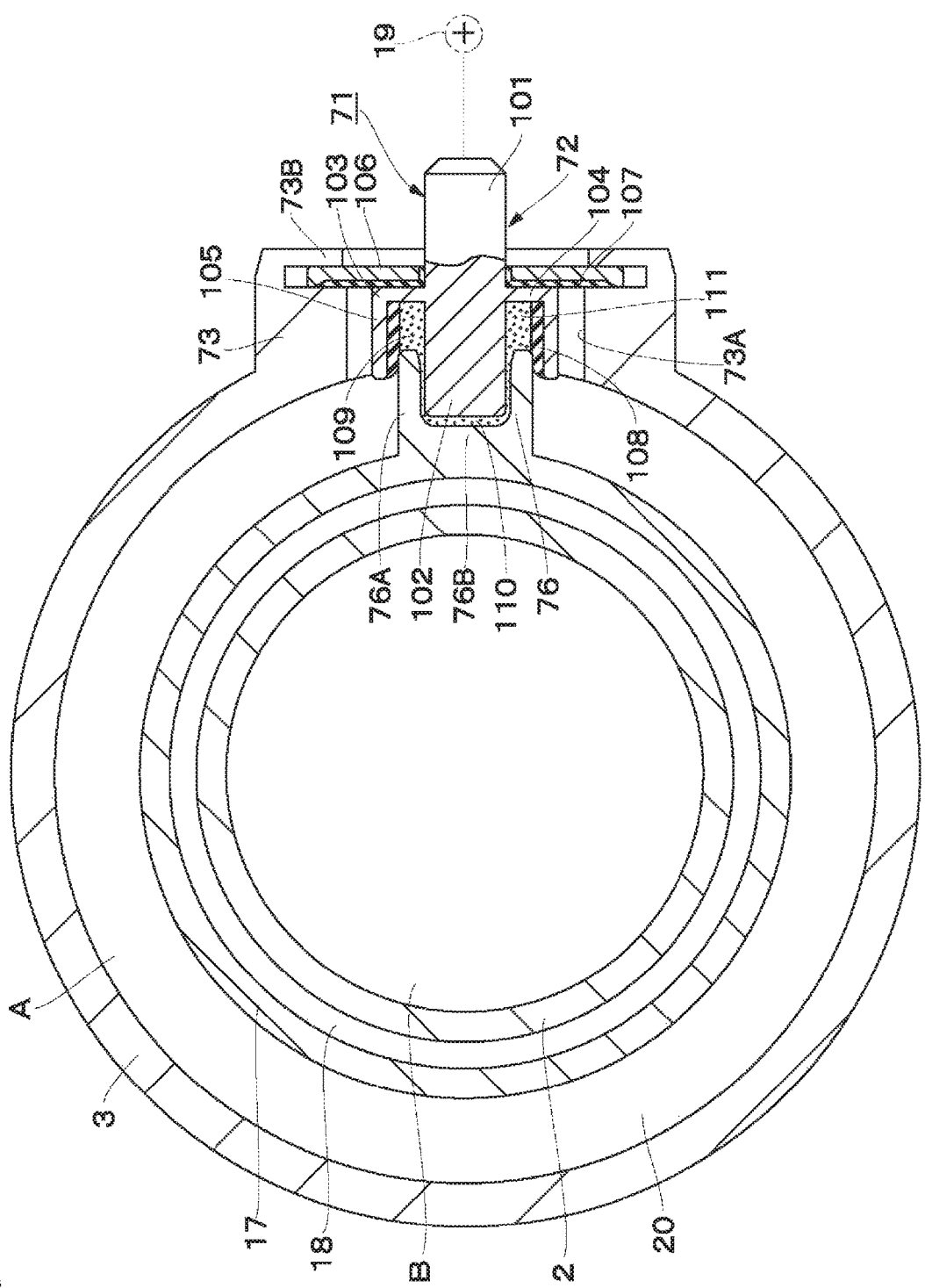
FIG. 11 is a cross-sectional view of an electrode connector and other components according to a sixth embodiment, as viewed from the same direction as FIG. 2.

FIG. 11 shows a sixth embodiment. The sixth embodiment is characterized in that a conducting device is an electrically conductive liquid (the liquid may be in a gel or creamy state). In the sixth embodiment, similar constituent elements to those of the first and fourth embodiments will be provided with the same reference signs, and the description of these constituent elements will be omitted.

An electrode pin 101 as an imparting unit is made of electrically conductive material. The electrode pin 101 is a pin-like member having a circular cross-section and extending in the axial direction. According to the sixth embodiment, the electrode pin 101 includes a pin portion 102 extending in an axial direction, and an umbrella-like cover portion 103 protruding from an axially middle portion of the pin portion 102 over the entire periphery of the pin portion 102 in a radially outward direction. The cover portion 103 includes a ring-like flange portion 104 extending from the middle portion of the pin portion 102 over the entire periphery of the pin portion 102 in the radially outward direction, and a circular cylinder portion 105 extending from an outer diameter side of the ring-like flange portion 104 over the entire periphery of the ring-like flange portion 104 toward an intermediate cylinder 17 side.

The ring-like flange portion 104 has a lateral surface (lateral surface on the opposite side to the intermediate cylinder 17 side) in abutting contact with a retainer plate 106. The retainer plate 106 has one lateral surface (inner lateral surface, that is, a lateral surface on the intermediate cylinder 17 side) which is provided with a ring-like elastic body 107, for example, by baking rubber. The ring-like elastic body 107 seals a gap between the retainer plate 106 and the ring-like flange portion 104 with the retainer plate 106 fixed by a caulking portion 73B of an attachment cylinder 73 of an outer cylinder 3.

A circular cylindrical elastic body 108 is disposed in an inner peripheral side of the circular cylinder portion 105, for example, by baking rubber. The circular cylindrical elastic body 108 seals a gap between an inner peripheral side of the circular cylindrical portion 105 of the electrode pin 101 and an outer peripheral side of the circular cylinder portion 76 of the intermediate cylinder 17 in the liquid- and gas-tight manner. A distal end side (intermediate cylinder 17 side) of the electrode pin 101 is thus separated from the reservoir chamber A by the cover portion 103 of the electrode pin 101 and the circular cylinder portion 76 of the intermediate cylinder 17. The distal end side of the electrode pin 101 is therefore a separated chamber 109 formed by the cover portion 103 of the electrode pin 101 and the circular cylinder portion 76 of the intermediate cylinder 17.

The distal end side of the electrode pin 101 is inserted in the circular cylinder portion 76 of the intermediate cylinder 17 in an electrically contacted manner. There is a gap 110 between the circular cylinder portion 76 and the electrode pin 101. The distal end side of the electrode pin 101 is therefore not in a direct contact with the intermediate cylinder 17 including the circular cylinder portion 76 within the circular cylinder portion 76. The distal end side of the electrode pin 101 is located across the gap 110 from the intermediate cylinder 17 including the circular cylinder portion 76. The distal end side of the electrode pin 101 is located away from the circular cylinder portion 76 both in the axial and radial directions. An electrically conductive liquid as the conducting device, or an electrically conductive grease 111, is disposed between the circular cylinder portion 76 and the electrode pin 101 so as to stuff the gap 110 (so as to fill the gap 110). The separated chamber 109 is thus filled with the electrically conductive grease 111. The electrically conductive grease 111 directly contacts (adheres to) both the distal end side of the electrode pin 101 and the circular cylinder portion 76 to electrically connect the electrode pin 101 and the intermediate cylinder 17 to each other. The electrically conductive grease 111 is sealed in the separated chamber 109 by the circular cylindrical elastic body 108 in a tight contact with the outer peripheral side of the circular cylinder portion 76 of the intermediate cylinder 17.

The sixth embodiment supplies (applies) a voltage to the intermediate cylinder 17 through the electrically conductive grease 111 described above. The sixth embodiment is not particularly different from the fourth in basic operation.

Especially the sixth embodiment uses the electrically conductive grease 111 as a conducting device. The electrically conductive grease 111 with flowability enters the gap 110 between the distal end side of the electrode pin 101 and the circular cylinder portion 76. This improves the stability of an electrical contact between the electrode pin 101 and the circular cylinder portion 76.

The sixth embodiment has been explained with an example in which the electrically conductive grease 111 is used as the electrically conductive liquid. However, the electrically conductive liquid is not limited to the electrically conductive grease 111. Usable electrically-conductive substances include mercury, electrically-conductive epoxy, etc., or more specifically, various kinds of flowable, electrically-conductive substances which are in a liquid form (including gel and creamy forms) at least when introduced into the cylinder device. The electrically-conductive substance may be solidified after being introduced into the cylinder device. Likewise, the elastic bodies 107 and 108 may be made of resin, such as silicone, instead of rubber.

Figure 12:
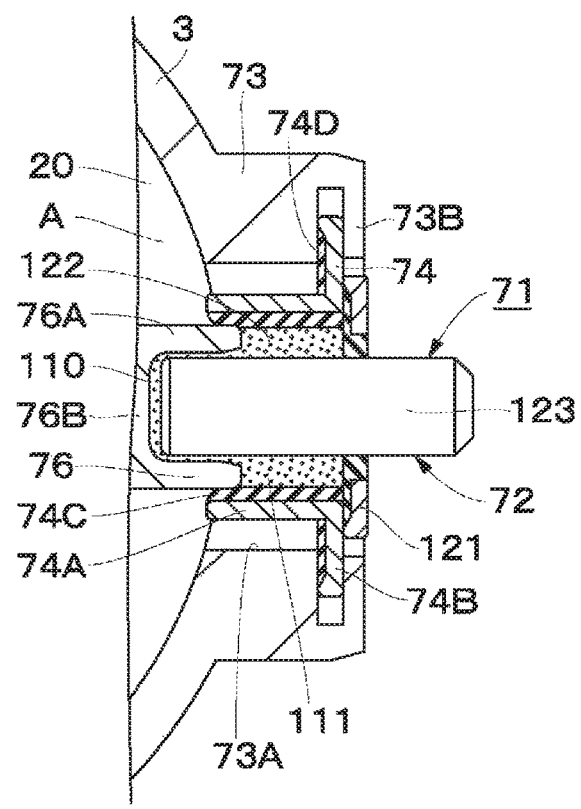
FIG. 12 is a sectional view of a relevant part including an imparting unit, a conducting device, and other components according to a fourth modification.

The sixth embodiment has been explained with an example in which the separated chamber 109 on the distal end side of the electrode pin 101 is defined by the cover portion 103 of the electrode pin 101 and the circular cylinder portion 76 of the intermediate cylinder 17. However, the separated chamber does not necessarily have to be defined this way. For example, as in a fourth modification shown in FIG. 12, the joint member 74 and the restrainer plate 121 in abutting contact with the joint member 74 according to the fourth embodiment may be used to form a separated chamber 122. In such a case, a column-like electrode pin 123 may be utilized.

Figure 13:
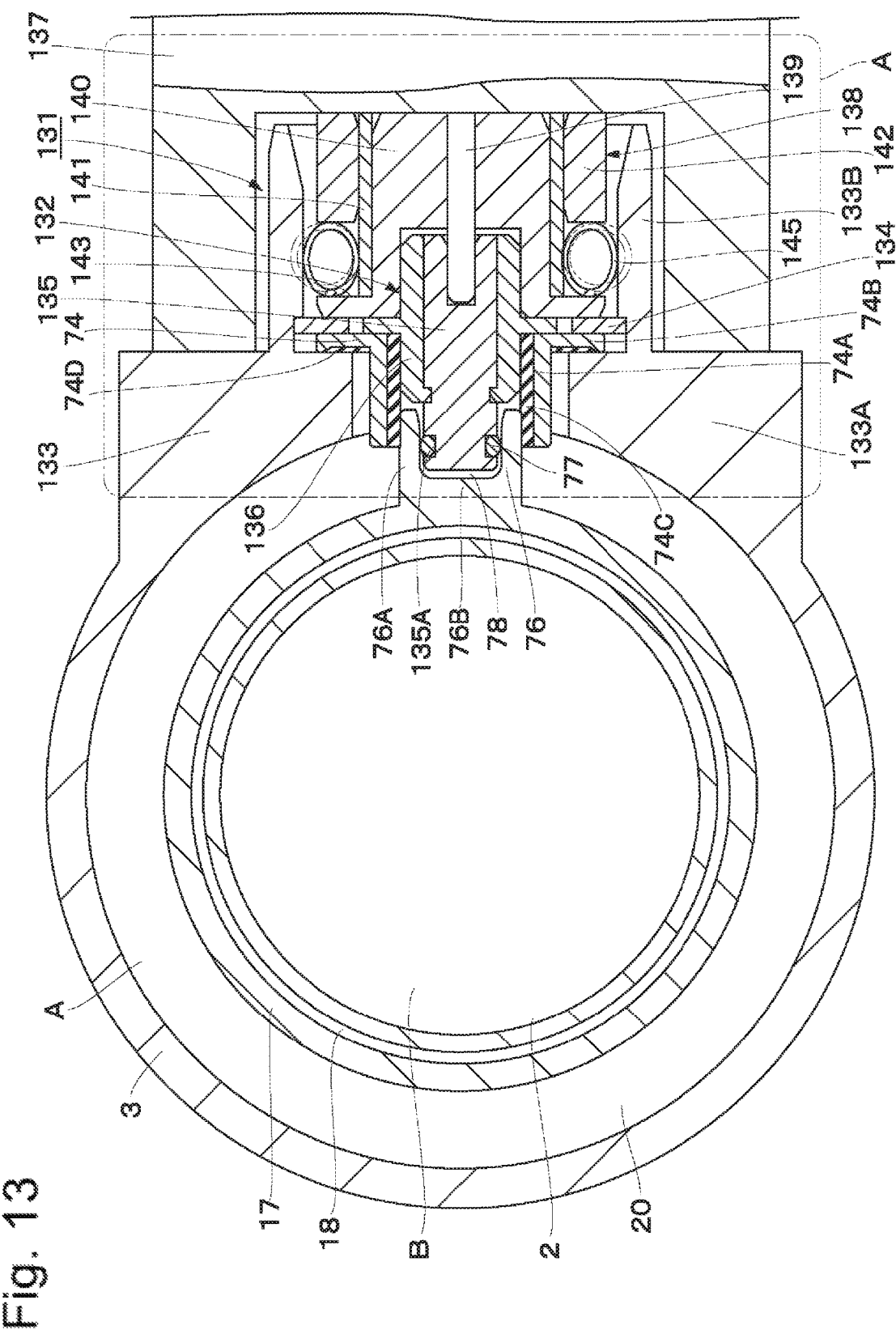
FIG. 13 is a cross-sectional view of an electrode connector and other components according to a seventh embodiment, as viewed from the same direction as FIG. 2.
Figure 14:
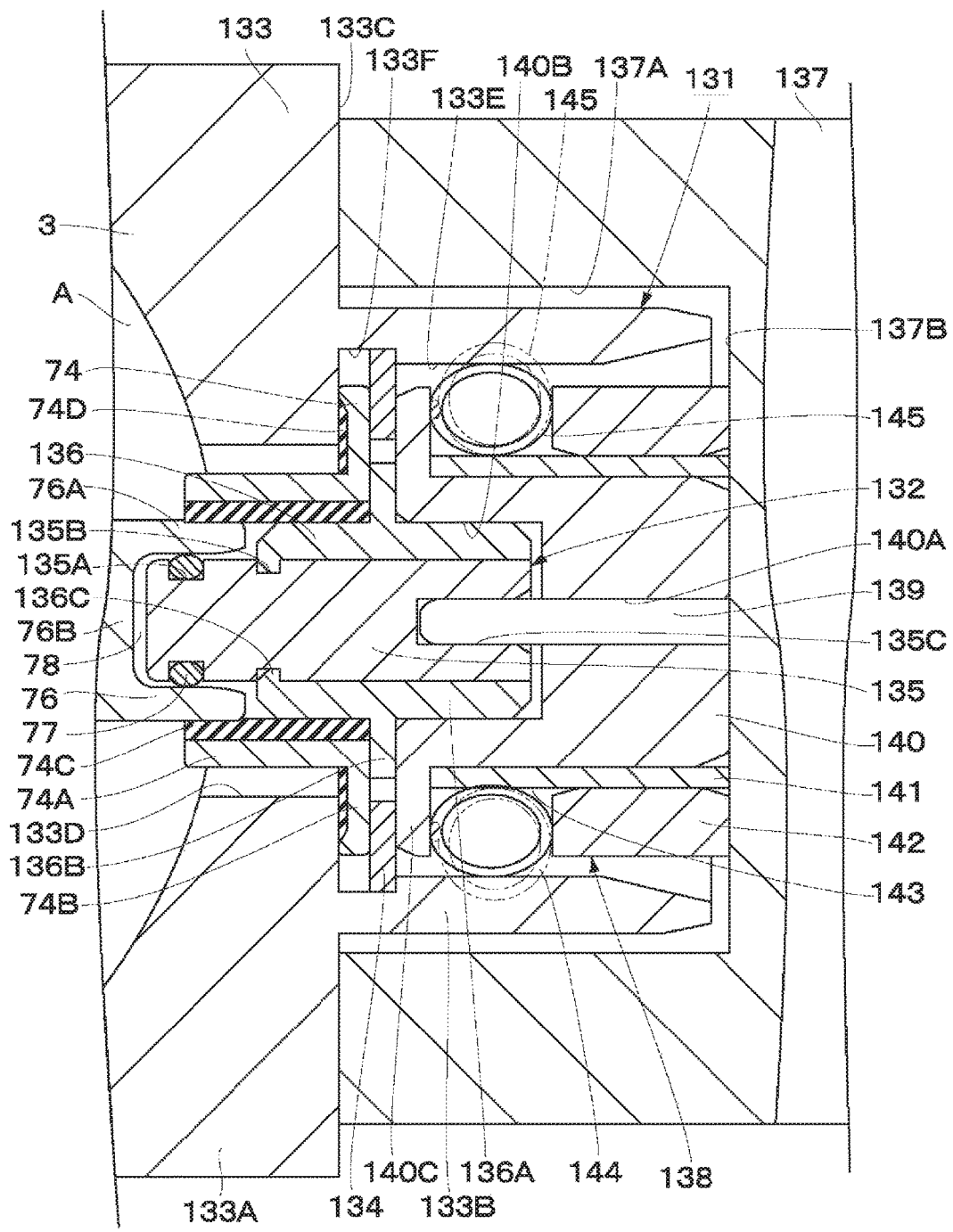
FIG. 14 is an enlarged sectional view of an area represented by A in FIG. 13, which includes the electrode connector and other components.

FIGS. 13 and 14 show a seventh embodiment. The seventh embodiment is characterized in that a high-voltage driver is attached (fixed) to an outer cylinder, and the high-voltage driver is connected to an electrode pin and the outer cylinder by a driver connecting member (substrate electrode member). In the seventh embodiment, similar constituent elements to those of the fourth embodiment will be provided with the same reference signs, and the description of these constituent elements will be omitted.

The seventh embodiment utilizes an electrode connector 131, instead of the electrode connector 71 of the fourth embodiment. The electrode connector 131 includes an intermediate electrode member 132 disposed on the outer cylinder 3 side, a circular cylinder portion 76 as an extending portion, which is disposed on an intermediate cylinder 17 side, and a driver connecting member (substrate electrode member) 138 discussed later. The intermediate electrode member 132 includes an attachment portion 133, a joint member 74 as a separating member, and an electrode pin 135 as an imparting unit.

The attachment portion 133 is disposed on an outer peripheral side of the outer cylinder 3 so as to protrude from the outer peripheral side in a radially outward direction. The attachment portion 133 is formed integrally with the outer cylinder 3. The attachment portion 133 includes a driver attachment portion 133A and an attachment cylinder 133B. The driver attachment portion 133A is attached (fixed) with a high-voltage driver 137 which generates a high voltage. The driver attachment portion 133A is a mounting seat for mounting the high-voltage driver 137 on the outer cylinder 3. The high-voltage driver 137 is mounted on the outer cylinder 3 so as to abut on a mounting seat surface 133C of the driver attachment portion 133A. The driver attachment portion 133A is provided with an electrode hole 133D through which the electrode pin 135, the circular cylinder portion 76, and the joint member 74 are inserted.

The attachment cylinder 133B protrudes from the mounting seat surface 133C of the driver attachment portion 133A toward the high-voltage driver 137 side (opposite side to the intermediate cylinder 17). The attachment cylinder 133B has a circular cylinder-like shape. The inner side of the attachment cylinder 133B is an electrode hole 133E which is concentric with the electrode hole 133D of the driver attachment portion 133A. The electrode hole 133E is inserted with the joint member 74, the electrode pin 135, and the driver connecting member 138. An annular groove 133F is formed in an inner peripheral side of a proximal end side of the attachment cylinder 133B, that is, a connecting region between the attachment cylinder 133B and the driver attachment portion 133A.

The annular groove 133F is formed in the inner peripheral side of the attachment cylinder 133B over the entire periphery as a recessed groove which is recessed in the radially outward direction. The annular groove 133F is engaged (fitted) with a retraining ring 134. The retaining ring 134 is reduced in diameter to be inserted into the annular groove 133F and then enlarged in diameter within the annular groove 133F to be engaged with the annular groove 133F. In this state, the retainer ring 134 can press a flange portion 74B of the joint member 74 toward the intermediate cylinder 17 side.

The joint member 74 is similar to the joint member 74 of the fourth embodiment and includes a cylinder portion 74A, the flange portion 74B, a circular cylindrical elastic body 74C, and a ring-shaped elastic body 74D. The circular cylindrical elastic body 74C seals a gap between an inner peripheral surface of the cylinder portion 74A and an outer peripheral surface of the circular cylinder portion 76 in a liquid- and gas-tight manner. The ring-shaped elastic body 74D seals a gap between a one lateral surface of the flange portion 74B and (the mounting seat surface 133C of) the driver attachment portion 133A in a liquid- and gas-tight manner.

The electrode pin 135 is connected to a battery 19 via the high-voltage driver 137. Like the electrode pin 75 of the fourth embodiment, the electrode pin 135 is configured to impart a voltage (electric field) to the intermediate cylinder 17. The electrode pin 135 is inserted in the circular cylinder portion 76 so as to be in an indirect electrical contact with (the circular cylinder portion 76 of) the intermediate cylinder 17. The electrode pin 135 may be inserted in the circular cylinder portion 76 so as to be in a direct electrical contact with (the circular cylinder portion 76 of) the intermediate cylinder 17. The electrode pin 135 is made of electrically conductive material. The electrode pin 135 is a pin-like member having a circular cross-section and extending in an axial direction. The electrode pin 135 has a distal end side (intermediate cylinder 17 side) provided with a recessed groove 135A which is recessed in a radially inward direction over the entire periphery. An annular spring 77 as a conducting device is placed in the recessed groove 135A.

An attachment groove 135B is formed in a region located in the distal end side of the electrode pin 135. The region is exposed from the circular cylinder 76 (that is, a region closer to a proximal end side than the circular cylinder portion 76). The attachment groove 135B is recessed in the radially inward direction over the entire periphery. The attachment groove 135B is engaged with a claw 136C of an insulator 136. Disposed in the proximal end of the electrode pin 135 is a coupling hole 135C extending in the axial direction of the electrode pin 135. A high-voltage pin 139 of the driver connecting member 138 is inserted in the coupling hole 135C.

The insulator 136 covers a portion of the electrode pin 135, which is exposed from the circular cylinder portion 76. The insulator 136 includes a circular cylinder portion 136A covering the periphery of the electrode pin 135 and a flange portion 136B protruding from an outer peripheral surface of the circular cylinder portion 136A in the radially outward direction. A portion of the circular cylinder portion 136A, which is located between a distal end thereof and the flange portion 136B (intermediate cylinder 17 side), is inserted in the cylinder portion 74A of the joint member 74. A portion of the circular cylinder portion 136A, which is located between a proximal end thereof and the flange portion 136B (high voltage driver 137 side), is inserted in (a large-diameter bore 140B of) a housing 140 of the driver connecting member 138.

The flange portion 136B is sandwiched between the joint member 74 and the housing 140. The circular cylinder portion 136A has an opening at the distal end thereof, which is provided with the claw 136C protruding in the radially inward direction. The claw 136C is engaged with the attachment groove 135B of the electrode pin 135 in a retained manner. The insulator 136 is thus mounted on the electrode pin 135 so as to cover the periphery of the middle portion and the periphery of the proximal end portion of the electrode pin 135. The insulator 136 is made of electrically insulating material, and keeps the electrode pin 135 and the joint member 74 electrically insulated from each other. The insulator 136 further keeps the electrode pin 135 and the housing 140 of the driver connecting member 138 electrically insulated from each other.

Like the circular cylinder portion 76 of the fourth embodiment, the circular cylinder portion 76 of the intermediate cylinder 17 includes a cylinder portion 76A and a bottom portion 76B. The circular cylinder portion 76 is inserted with the distal end side of the electrode pin 135, so that the circular cylinder portion 76 and the electrode pin 135 are in an electrical contact with each other via the annular spring 77. The annular spring 77 is similar to the annular spring 77 of the fourth embodiment and is fitted in the recessed groove 135A of the electrode pin 135.

The high-voltage driver 137 boosts a DC voltage outputted from the battery 19, and then supplies (outputs) the DC voltage to the intermediate cylinder 17. To that end, the high-voltage driver 137 includes a boost circuit for boosting the DC voltage outputted from the battery 19, a control circuit for controlling the boost circuit, neither shown, and the like. The high-voltage driver 137 is mounted on (fixed to) the outer cylinder 3 (driver attachment portion 133A) of the shock absorber 1. The high-voltage driver 137 is provided with a recessed portion 137A which covers the attachment cylinder 133B. The driver connecting member 138 is disposed in the recessed portion 137A of the high-voltage driver 137. The driver connecting member 138 protrudes from a bottom portion 137B of the recessed portion 137A toward the intermediate cylinder 17 side within the attachment cylinder 133B.

The driver connecting member 138 electrically connects a positive side of the high-voltage driver 137 and the electrode pin 135 to each other, and electrically connects a ground side of the high-voltage driver 137 and (the attachment cylinder 133B of) the outer cylinder 3 to each other. The driver connecting member 138 includes a high-voltage pin (HV pin) 139 as an imparting unit, the housing 140, a ground pin 141 as a ground member, a spacer 142, and a ground spring 145.

The high-voltage pin 139 is supported by (fixed to) the high-voltage driver 137 and protrudes from the bottom portion 137B of the recessed portion 137A toward the intermediate cylinder 17 side. Like the electrode pin 135, the high-voltage pin 139 is made of electrically conductive material and formed into a pin-like member having a circular cross-section and extending in the axial direction. The high-voltage pin 139 has a distal end side (intermediate cylinder 17 side) which is inserted in the coupling hole 135C of the electrode pin 135. The high-voltage pin 139 and the electrode pin 135 are thus electrically connected together. A proximal end side (opposite side to the intermediate cylinder 17) of the high-voltage pin 139 is connected to a substrate (boost circuit) of the high-voltage driver 137. The electrode pin 135 is thus connected to (the positive side of) the high-voltage driver 137 via the high-voltage pin 139.

The housing 140 is supported by (fixed to) the high-voltage driver 137 and protrudes from the bottom portion 137B of the recessed portion 137A toward the intermediate cylinder 17 side. The housing 140 has a cylindrical shape. The housing 140 includes a small-diameter bore 140A inserted with the high-voltage pin 139, the large-diameter bore 140B in which the electrode pin 135 is inserted together with the insulator 136, and a flange portion 140C which is disposed in an opening side of the large-diameter bore 140B and protrudes in the radially outward direction. The flange portion 140C presses the retainer ring 134 and the flange portion 136B of the insulator 136 toward the intermediate cylinder 17 side with the high-voltage driver 137 mounted on the outer cylinder 3. The housing 140 is made of electrically insulating material, and keeps the electrode pin 135 and the high-voltage pin 139 electrically insulated from the ground pin 141.

The ground pin 141 is supported by (fixed to) the high-voltage driver 137 and protrudes from the bottom portion 137B of the recessed portion 137A toward the intermediate cylinder 17 side. The ground pin 141 is made of electrically conductive material and has a circular cylinder-like shape. The ground pin 141 is fitted in the housing 140. The ground pin 141 is connected to the ground via the high-voltage driver 137. The ground pin 141 is electrically connected to (the attachment cylinder 133B of) the outer cylinder 3 through the ground spring 145, thus connecting (the attachment cylinder 133B of) the outer cylinder 3 to the ground through the ground spring 145, the ground pin 141, and the high-voltage driver 137. The inner cylinder 2 is electrically connected to the outer cylinder 3 through the rod guide 9, the bottom valve 12, the bottom cap 4, and the like (which means that the inner cylinder 2 and the outer cylinder 3 are both connected to the ground).

The spacer 142 is supported by (fixed to) the high-voltage driver 137 and protrudes from the bottom portion 137B of the recessed portion 137A toward the intermediate cylinder 17 side. The spacer 142 is made of electrically insulating material and has a circular cylinder-like shape. The spacer 142 has a smaller axial dimension than the ground pin 141. A recessed groove 143 is accordingly defined by an outer peripheral surface of the ground pin 141, an end surface of the spacer 142, and the flange portion 140C of the housing 140. The ground spring 145 as a conducting device is placed in the recessed groove 143.

In other words, the ground pin 141 connected to the ground is inserted in the attachment cylinder 133B of the outer cylinder 3 so as to be in an indirect electrical contact with the outer cylinder 3. The ground pin 141 is not in a direct contact with the outer cylinder 3 including the attachment cylinder 133B within the attachment cylinder 133B. The ground pin 141 is located across a gap 144 from the outer cylinder 3 including the attachment cylinder 133B. The ground pin 141 is located away from the attachment cylinder 133B of the outer cylinder 3 in the radial direction. The ground spring 145 as a conducting device is disposed between the ground pin 141 and the attachment cylinder 133B so as to stuff the gap 144 (bridge the gap 144). According to the present embodiment, the ground spring 145 is disposed so as to stuff the gap 144. This configuration is intended to achieve a multi-point contact, so that the ground spring 145 does not necessarily have to stuff the gap 144 over the entire circumference. The ground pin 141 may be inserted in the attachment cylinder 133B so as to come into a direct electrical contact with the outer cylinder 3.

The ground spring 145 is configured to electrically connect the ground pin 141 and the attachment cylinder 133B together. The ground spring 145 is formed, for example, of an electrically-conductive, metal spring member (annular spring) in a shape of a segment ring (substantially C-like shape). The ground spring 145 is fitted in the recessed groove 143. The ground spring 145 may be, for example, a coil spring with a plurality of coils (windings). In such a case, the ground spring 145 (coil spring) may be placed in the recessed groove 143 so that an axial center line of the coil spring extends along the recessed groove 143 (so that the axial center line becomes a ring-like shape).

The ground pin 141 is inserted in the attachment cylinder 133B with the ground spring 145 fitted in the recessed groove 143. In this process, the ground spring 145 is squeezed (reduced in diameter) into the attachment cylinder 133B, which brings the ground pin 141 and the attachment cylinder 133B into electrical connection (conduction). FIGS. 13 and 14 show, by chain double-dashed lines, the ground spring 145 in a free state. FIGS. 13 and 14 further show, by solid lines, the ground spring 145 which is elastically deformed by coming into contact with (the inner peripheral surface of) the attachment cylinder 133B within the recessed groove 143.

The ground spring 145 is therefore positionally restrained within the recessed groove 143, which prevents or reduces the possibility of poor conduction caused by vibration. Furthermore, a circumferential contact of the ground spring 145 with (the outer peripheral surface of) the ground pin 141 and (the inner peripheral surface of) the attachment cylinder 133B ensures contact area, improving contact reliability and reducing contact resistance. If the ground spring 145 is formed of a coil spring, this provides contact points corresponding to the number of coils by which the coil spring is squeezed. This also improves the contact reliability and reduces the contact resistance.

The seventh embodiment connects the high-voltage driver 137 to the electrode pin 135 and the outer cylinder 3 through the driver connecting member 138 thus configured. The seventh embodiment is not particularly different from the fourth in basic operation.

Especially in the seventh embodiment, there is the gap 144 between the ground pin 141 and the attachment cylinder 133B. The ground spring 145 for electrically connecting the ground pin 141 and the attachment cylinder 133B together is placed in the gap 144 so as to stuff the gap 144. The ground spring 145 therefore improves the stability of an electrical contact (conducted state) between the ground pin 141 and the attachment cylinder 133B. Furthermore, the ground spring 145 is elastically deformed between the ground pin 141 and the attachment cylinder 133B, and is therefore positionally restrained. This prevents or reduces the possibility of poor conduction caused by vibration, improving the contact reliability and reducing the contact resistance.

The seventh embodiment has been explained with the example in which the ground spring 145 made of metal is placed in the recessed groove 143. However, instead of the ground spring 145, for example, a ground spring like the electrically conductive rubber 81 shown in FIG. 7 may be placed in the recessed groove 143. For another example, a ground spring like the leaf spring 82 having a J-like cross-section, which is shown in FIG. 8, may be placed in the recessed groove 143. It is also possible to form a recessed groove in the attachment cylinder 133B side and place a ground spring in the recessed groove formed in the attachment cylinder 133B side.

Each of the embodiments has been explained with the example in which the hydraulic fluid 20 flows from the upper end side toward the lower end side in the axial direction. Instead of that, for example, the hydraulic fluid 20 may be configured to flow from the lower end side toward the upper end side in the axial direction; flow from the left end side (or right end side) toward the right end side (or left end side) in the axial direction; or flow from the front end side (rear end side) toward the rear end side (front end side) in the axial direction. In short, the hydraulic fluid 20 may be configured to flow from one end side in the axial direction.

Each of the embodiments has been explained with the example in which the shock absorber 1 is longitudinally disposed. However, instead of the longitudinal arrangement, for example, the shock absorber 1 may be tilted without causing aeration. In this way, the shock absorber 1 may be disposed in a desired posture to suit an installation target.

Each of the embodiments has been explained with the example in which the hydraulic fluid 20 as a functional fluid comprises the electrorheological fluid (ER fluid). However, the hydraulic fluid does not necessarily have to comprise the electrorheological fluid. For example, a magnetic fluid (MR fluid) which changes in fluid condition under the presence of a magnetic field may be used to form a hydraulic fluid as a functional fluid. If the magnetic fluid is used, the intermediate cylinder 17 may be used as a magnetic pole instead of an electrode (that is, a magnetic field supplied from a magnetic field supply unit is imparted to the intermediate cylinder). In such a case, for example, the magnetic field supply unit is used to generate a magnetic field between the inner cylinder 2 and the intermediate cylinder 17. The magnetic field is variably controlled to variably adjust the generated damping force. The insulative holding members 10 and 14 and the like may be made, for example, of non-magnetic material. A conducting device configured to magnetically connect the imparting unit and the extending portion to each other may be placed in a gap between the extending portion and the imparting unit so as to be in a multi-point contact within the gap.

The embodiments have been explained with the examples in which the shock absorbers 1 as cylinder devices are used in four-wheel automobiles. However, the shock absorbers 1 do not necessarily have to be used in the four-wheel automobiles, but may be widely used as various shock absorbers (cylinder devices) for absorbing the shock generated in shock absorbing targets, such as shock absorbers used in two-wheel vehicles, in railway vehicles, in every kind of machines and devices including general industrial equipment, and in architectural structures. Needless to say, the embodiments illustrate examples, and the configurations of different embodiments may be partly replaced or combined.

The embodiments discussed above make it possible to improve the stability in imparting an electric field (voltage) or a magnetic field from the imparting unit to the intermediate cylinder.

According to each of the embodiments, the extending portion which extends toward the outer cylinder is disposed in the outer peripheral side of the intermediate cylinder. The imparting unit is inserted in the extending portion in the electrically contacted manner. The fluid flowing through the reservoir chamber therefore flows around the extending portion. Consequently, as compared to the configuration disclosed in the Patent Literature 1, in which the fluid force of the fluid flowing through the reservoir chamber is directly applied only to the imparting unit (compression spring), the embodiments improve the stability in imparting the electric field (voltage) or the magnetic field from the imparting unit to the intermediate cylinder.

In the case of the configuration where the joint member is inserted onto the inner or outer periphery of the extending portion, it is possible to cover the periphery of the imparting unit with the extending portion and the joint member. The fluid force of the fluid flowing through the reservoir chamber then can be received by the extending portion and the joint member. This improves the stability in imparting the electric field (voltage) or the magnetic field from the imparting unit to the intermediate cylinder.

According to the embodiments, the separating member for liquid-tightly defining the imparting unit and the reservoir chamber from each other is disposed in the inner or outer periphery of the extending portion. This makes it possible to separate the imparting unit from the fluid which flows through the reservoir chamber and thus prevent the imparting unit from being applied with the fluid force of the fluid which flows through the reservoir chamber. This improves the stability in imparting the electric field (voltage) or the magnetic field from the imparting unit to the intermediate cylinder.

According to the embodiments, there is the gap between the extending portion and the imparting unit. The conducting device configured to electrically or magnetically connect the imparting unit and the extending portion to each other is disposed in the gap so as to be in a multi-point contact within the gap. The conducting device thus improves the stability of an electric or magnetic contact between the imparting unit and the extending portion. This improves the contact reliability and reduces the contact resistance.

According to the embodiments, the gap is formed in the axially-extending space between the imparting unit and the intermediate cylinder. The gap in the axially-extending space absorbs the tolerance between the intermediate cylinder including the extending portion and the imparting unit, which enhances assemblability.

According to the embodiments, the conducting device is the annular spring member. The annular spring member is elastically deformed between the extending portion and the imparting unit, and is therefore positionally restrained. This prevents or reduces the possibility of poor conduction caused by vibration. If the annular spring is the annular spring (coil spring) with a plurality of coils (windings), this provides contact points corresponding to the number of coils by which the annular spring is squeezed, which also improves the contact reliability and reduces the contact resistance.

According to the embodiments, the conducting device is the electrically conductive liquid. The flowable, electrically-conductive liquid enters the gap between the imparting unit and the extending portion. This improves the stability of an electrical contact between the imparting unit and the extending portion.

According to the embodiments, the ring member which forms the extending portion is partly disposed in the outer peripheral side of the intermediate cylinder in the axial direction. The imparting unit is disposed inside the extending portion so as to come into contact with the extending portion. The extending portion can be easily provided to the outer peripheral side of the intermediate cylinder by attaching the ring member provided with the extending portion to the intermediate cylinder. Since the imparting unit is in contact with the inside of the extending portion, the contact area between the extending portion and the imparting unit can be increased. The increased contact area reduces the contact resistance. This reduces heat generation in the contact region which is the electrical contact point, and further reduces power consumption.

According to the embodiments, the imparting unit is the pin-like member. The rear surface of the pin-like member is provided with the biasing device for biasing the pin-like member toward the intermediate cylinder. The pin-like member serving as the imparting unit therefore can be pressed against the intermediate cylinder by the biasing device. This also improves the stability of contact between the imparting unit and the intermediate cylinder.

Considerable aspects of the cylinder devices according to the embodiments are, for example, as below.

A first aspect of the cylinder device comprises an inner cylinder containing a functional fluid which changes in fluid condition under the presence of an electric field or a magnetic field, the inner cylinder being inserted with a rod; an outer cylinder disposed on the outside of the inner cylinder; an intermediate cylinder disposed between the inner cylinder and the outer cylinder to create a passage between the inner cylinder and the intermediate cylinder, through which the functional fluid flows from one end side to the other end side in an axial direction in response to an advancing/returning movement of the rod, the intermediate cylinder serving as an electrode or a magnetic pole; a reservoir chamber formed between the intermediate cylinder and the outer cylinder and containing the functional fluid and a working gas; a rod guide disposed so as to close one end of the inner cylinder and one end of the outer cylinder and supporting the rod; and an imparting unit configured to impart an electric field or a magnetic field from an electric field supply unit or a magnetic field supply unit to the intermediate cylinder. The intermediate cylinder is provided in an outer peripheral side with an extending portion which extends toward the outer cylinder. The imparting unit is inserted in the extending portion an electrically contacted manner.

In a second aspect according to the first aspect, a separating member is disposed in an inner or outer periphery of the extending portion, the separating member being configured to liquid-tightly define the imparting unit and the reservoir chamber from each other.

In a third aspect according to the first and second aspects, there is a gap between the extending portion and the imparting unit. A conducting device configured to electrically or magnetically connect the imparting unit and the extending portion to each other is disposed in the gap so as to be in a multi-point contact within the gap.

In a fourth aspect according to the third aspect, the gap is formed in an axially-extending space between the imparting unit and the intermediate cylinder.

In a fifth aspect according to the third aspect, the conducting device is an annular spring member.

In a sixth aspect according to the third aspect, the conducting device is an electrically conductive liquid.

In a seventh aspect according to the first aspect, a ring member which forms the extending portion is partly disposed in the outer peripheral side of the intermediate cylinder in the axial direction. The imparting unit is in contact with the inside of the extending portion.

In an eighth aspect according to the first to seventh aspects, the imparting unit is a pin-like member. The pin-like member has a rear surface provided with a biasing device configured to bias the pin-like member toward the intermediate cylinder.

REFERENCE SIGNS LIST 1 shock absorber (cylinder device)
2 inner cylinder
3 outer cylinder
5 piston
8 piston rod (rod)
9 rod guide
17 intermediate cylinder
18 passage
19 battery (voltage supply unit, electric field supply unit)
20 hydraulic fluid (fluid, functional fluid)
29, 41, 60, 75, 91, 101, 123, 135 electrode pin (imparting unit)
30 ring member
32, 42 extending portion
55, 74 joint member (separating member)
59 elastic member (biasing device)
61 circular cylinder member (extending portion)
76 circular cylinder portion (extending portion)
77, 94 annular spring (conducting device)
78, 93 gap
81 electrically conductive rubber (conducting device)
82 leaf spring (conducting device)
92 column portion
111 electrically conductive grease (conducting device)
A reservoir chamber
B rod-side oil chamber
C bottom-side oil chamber

The invention claimed is:

1. A cylinder device comprising:
an inner cylinder sealingly containing a functional fluid which changes in fluid condition under the presence of an electric field;
a rod inserted in the inner cylinder;
an outer cylinder disposed outside of the inner cylinder;
an intermediate cylinder disposed between the inner cylinder and the outer cylinder to create a passage between the inner cylinder and the intermediate cylinder, through which the functional fluid flows from one end side to the other end side in an axial direction in response to an advancing returning movement of the rod, the intermediate cylinder serving as an electrode;
a reservoir chamber formed between the intermediate cylinder and the outer cylinder and sealingly containing the functional fluid and a working gas;
a rod guide disposed so as to close one end of the inner cylinder and one end of the outer cylinder and supporting the rod; and
an imparting unit configured to impart a voltage from a voltage supply unit to the intermediate cylinder, wherein
the intermediate cylinder is provided with an electrically-conductive extending portion which extends toward the outer cylinder, and the electrically-conductive extending portion is provided in an outer peripheral side of the intermediate cylinder and within the reservoir chamber, and
the imparting unit is inserted in the extending portion in an electrically contacted manner.

2. The cylinder device according to claim 1, wherein a gap is provided between the extending portion and the imparting unit, and a conducting device configured to electrically or magnetically connect the imparting unit and the extending portion to each other is disposed in the gap so as to be in a multi-point contact within the gap.

3. The cylinder device according to claim 2, wherein the gap is formed in an axially-extending space between the imparting unit and the intermediate cylinder.

4. The cylinder device according to claim 3, wherein the imparting unit is a pin-like member, and
the pin-like member has a rear surface provided with a biasing device configured to bias the pin-like member toward the intermediate cylinder.

5. The cylinder device according to claim 2, wherein the conducting device is an annular spring member.

6. The cylinder device according to claim 5, wherein the imparting unit is a pin-like member, and
the pin-like member has a rear surface provided with a biasing device configured to bias the pin-like member toward the intermediate cylinder.

7. The cylinder device according to claim 2, wherein the conducting device is an electrically conductive liquid.

8. The cylinder device according to claim 7, wherein the imparting unit is a pin-like member, and
the pin-like member has a rear surface provided with a biasing device configured to bias the pin-like member toward the intermediate cylinder.

9. The cylinder device according to claim 2, wherein the imparting unit is a pin-like member, and
the pin-like member has a rear surface provided with a biasing device configured to bias the pin-like member toward the intermediate cylinder.

10. The cylinder device according to claim 1, wherein a separating member is disposed in an inner or outer periphery of the extending portion, the separating member being configured to liquid-tightly define the imparting unit and the reservoir chamber from each other.

11. The cylinder device according to claim 10, wherein there is a gap between the extending portion and the imparting unit, and a conducting device configured to electrically connect the imparting unit and the extending portion to each other is disposed in the gap so as to be in a multi-point contact within the gap.

12. The cylinder device according to claim 1, wherein a ring member which forms the extending portion is partly disposed in the outer peripheral side of the intermediate cylinder in the axial direction, and the imparting unit is in contact with the inside of the extending portion.

13. The cylinder device according to claim 1, wherein the imparting unit is a pin-like member, and the pin-like member has a rear surface provided with a biasing device configured to bias the pin-like member toward the intermediate cylinder.

* * * * *